US011876715B2

(12) United States Patent
Yuan et al.

(10) Patent No.: US 11,876,715 B2
(45) Date of Patent: Jan. 16, 2024

(54) LOAD BALANCING METHOD, DEVICE, AND SYSTEM

(71) Applicant: Huawei Technologies Co., Ltd., Shenzhen (CN)

(72) Inventors: Tingqiu Yuan, Shenzhen (CN); Cong Xu, Beijing (CN); Guoping Li, Shenzhen (CN); Boyan Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/069,378

(22) Filed: Oct. 13, 2020

(65) Prior Publication Data
US 2021/0029041 A1 Jan. 28, 2021

Related U.S. Application Data

(63) Continuation of application No. PCT/CN2019/079302, filed on Mar. 22, 2019.

(30) Foreign Application Priority Data

Apr. 13, 2018 (CN) .......................... 201810333794.1

(51) Int. Cl.
G06F 15/16 (2006.01)
H04L 47/125 (2022.01)
(Continued)

(52) U.S. Cl.
CPC ............ H04L 47/125 (2013.01); H04L 43/10 (2013.01); H04L 47/115 (2013.01); H04L 47/283 (2013.01)

(58) Field of Classification Search
CPC ..... H04L 47/125; H04L 43/10; H04L 47/115; H04L 47/283; H04L 29/08297; H04L 67/1038; H04L 43/103; H04W 40/02
See application file for complete search history.

(56) References Cited

U.S. PATENT DOCUMENTS 8,072,901 B1 * 12/2011 Blair ...................... H04L 45/70
370/254
10,355,981 B1 * 7/2019 Matthews ............. H04L 45/302
(Continued)

FOREIGN PATENT DOCUMENTS

CN 101272290 A 9/2008
CN 101636976 A 1/2010
(Continued)

OTHER PUBLICATIONS

H. Kanaoka and T. Yoshihiro, "Combining local channel selection with routing metrics in multi-channel Wireless Mesh Networks," 2014 Seventh International Conference on Mobile Computing and Ubiquitous Networking (ICMU), Singapore, 2014, pp. 70-71 (Year : 2014).*

(Continued)

Primary Examiner — Oscar A Louie
Assistant Examiner — Messeret F Gebre
(74) Attorney, Agent, or Firm — Conley Rose, P.C.

(57) ABSTRACT

A load balancing method, device and system, where the method includes: determining, based on load statuses of respective probe channels on n paths between a source end and a destination end, a target path with a lightest load in the n paths, where a probe channel is used to transmit a probe packet that includes a bandwidth probe packet; sending a bandwidth probe packet to the destination end through a probe channel on the target path; receiving the bandwidth probe packet returned by the destination end; and sending, based on the bandwidth probe packet returned by the destination end, a to-be-transmitted data packet to the destination end through a data channel on the target path. Therefore, load balancing among a plurality of paths is implemented.

21 Claims, 12 Drawing Sheets

(51) Int. Cl.
*H04L 43/10* (2022.01)
*H04L 47/11* (2022.01)
*H04L 47/283* (2022.01)

(56) References Cited

U.S. PATENT DOCUMENTS

| | | | |
|---|---|---|---|
| 2007/0230352 A1* | 10/2007 | Kokku | H04L 45/24 |
| | | | 370/238 |
| 2011/0096694 A1* | 4/2011 | Jiang | H04L 47/283 |
| | | | 370/253 |
| 2015/0127797 A1 | 5/2015 | Attar et al. | |
| 2015/0281106 A1* | 10/2015 | Lee | H04L 45/38 |
| | | | 370/236 |
| 2016/0164778 A1* | 6/2016 | Guo | H04L 45/125 |
| | | | 370/392 |
| 2017/0295100 A1 | 10/2017 | Hira et al. | |
| 2019/0190833 A1* | 6/2019 | Georgios | H04L 43/026 |
| 2019/0288948 A1* | 9/2019 | Hira | H04L 47/115 |
| 2019/0342221 A1* | 11/2019 | Briscoe | H04L 47/30 |

FOREIGN PATENT DOCUMENTS

| | | | |
|---|---|---|---|
| CN | 103051709 A | | 4/2013 |
| CN | 103312607 A | | 9/2013 |
| CN | 104836750 A | | 8/2015 |
| CN | 105025525 A | | 11/2015 |
| CN | 105610709 A | | 5/2016 |
| CN | 107786440 A | | 3/2018 |
| CN | 108390820 A | | 8/2018 |
| KR | 20170085906 A | * | 10/2017 |
| WO | 2009149444 A1 | | 12/2009 |

OTHER PUBLICATIONS

Gomes, R. D., Queiroz, D. V., Lima Filho, A. C., Fonseca, I. E., & Alencar, M. S. (2017). Real-time link quality estimation for industrial wireless sensor networks using dedicated nodes. Ad Hoc Networks, 59, 116-33. (Year: 2017).*

N. Nordin, R. G. Clegg and M. Rio, "Multichannel cross-layer routing for sensor networks," 2016 23rd International Conference on Telecommunications (ICT), Thessaloniki, Greece, 2016, pp. 1-6 (Year: 2016).*

* cited by examiner

LOAD BALANCING METHOD, DEVICE, AND SYSTEM

CROSS-REFERENCE TO RELATED APPLICATIONS

This application is a continuation of International Patent Application No. PCT/CN2019/079302, filed on Mar. 22, 2019, which claims priority to Chinese Patent Application No. 201810333794.1, filed on Apr. 13, 2018. The disclosures of the aforementioned applications are hereby incorporated by reference in their entireties.

TECHNICAL FIELD

This application relates to the field of communications technologies, and in particular, to a load balancing method, device, and system.

BACKGROUND

To prevent congestion such as data packet stacking and packet loss, congestion control is needed for data packet transmission.

In other approaches, in a congestion control method, transmission channels between a source end and a destination end are classified into a data channel and a probe channel based on a proportion. Specifically, the source end first sends a bandwidth probe packet (for example, a Credit probe packet) to the destination end through the probe channel, and the bandwidth probe packet is sent to the destination end using a router, and is returned by the destination end to the source end. Then, the source end may detect an available bandwidth of the data channel from the source end to the destination end based on a packet loss rate of the bandwidth probe packet limited by the router, and send a data packet to the destination end based on the perceived available bandwidth of the data channel, thereby implementing congestion control on the data packet. In addition, in the congestion control method, the data packet is seldom stacked, and a round-trip time (RTT) of the data packet is basically fixed. Therefore, when there are a plurality of paths between the source end and the destination end, load balancing of the plurality of paths cannot be implemented based on the RTT.

Therefore, how to implement the load balancing among the plurality of paths based on the congestion control method becomes an urgent problem to be resolved currently.

SUMMARY

This application provides a load balancing method, device, and system, to implement load balancing among a plurality of paths.

According to a first aspect, an embodiment of this application provides a load balancing method, including: determining, based on load statuses of respective probe channels on n paths between a source end and a destination end, a target path with a lightest load in the n paths, where the probe channel is used to transmit a probe packet, the probe packet includes a bandwidth probe packet, and n is an integer greater than 1; sending a bandwidth probe packet to the destination end through a probe channel on the target path; receiving the bandwidth probe packet returned by the destination end; and sending, based on the bandwidth probe packet returned by the destination end, a to-be-transmitted data packet to the destination end through a data channel on the target path.

In the foregoing solution, the target path with the lightest load in the n paths is determined based on the load statuses of the respective probe channels on the n paths between the source end and the destination end, the bandwidth probe packet is sent to the destination end through the probe channel on the target path, the bandwidth probe packet returned by the destination end is received, and the to-be-transmitted data packet is sent to the destination end through the data channel on the target path based on the bandwidth probe packet returned by the destination end. Therefore, the target path with the lightest load is selected based on the load statuses of the respective probe channels on the n paths, thereby implementing load balancing among a plurality of paths.

In an implementable design, the probe packet further includes a load probe packet. Additionally, before the determining, based on load statuses of respective probe channels on n paths between a source end and a destination end, a target path with a lightest load in the n paths, the method further includes: sending a load probe packet to the destination end through a probe channel on each of the n paths; receiving the load probe packet returned by the destination end; and determining, based on the load probe packet returned on each path, a load status of the probe channel on each path.

In the foregoing solution, the load probe packet is sent to the destination end through the probe channel on each of the n paths, the load probe packet returned by the destination end is received, and the load status of the probe channel on each path is determined based on the load probe packet returned on each path. Therefore, the load status of the probe channel is determined.

In an implementable design, the determining, based on the load probe packet returned on each path, a load status of the probe channel on each path includes: using a round trip time (RTT) or an explicit congestion notification (ECN) identifier of the load probe packet returned on each path as load status information of the probe channel on each path.

In an implementable design, the following steps are periodically performed within first preset duration: sending the load probe packet to the destination end through the probe channel on each of the n paths; receiving the load probe packet returned by the destination end; and determining, based on the load probe packet returned on each path, the load status of the probe channel on each path.

In the foregoing solution, the load status of the probe channel is continuously updated by performing the following steps periodically within the first preset duration: sending the load probe packet to the destination end through the probe channel on each of the n paths; and receiving the load probe packet returned by the destination end; and determining, based on the load probe packet returned on each path, the load status of the probe channel on each path.

In an implementable design, the n paths are in one-to-one correspondence with n path identifiers, and the path identifier is used by an intermediate device to perform routing using a hash algorithm. Additionally, the load probe packet that is sent to the destination end through the probe channel on each path includes a path identifier corresponding to a path, where a packet header of the bandwidth probe packet and a packet header of the data packet all include a path identifier corresponding to the target path.

In the foregoing solution, the load probe packet that is sent to the destination end through the probe channel on each path includes a path identifier corresponding to a path, where the packet header of the bandwidth probe packet and the packet header of the data packet all include the path identifier corresponding to the target path. This resolves a problem of complex implementation of a source routing manner.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In the foregoing solution, the n path identifiers include the randomly determined m path identifiers, and the path identifiers respectively corresponding to the d paths in all the paths used to determine the target path previously. Therefore, a local optimal solution is used to determine the target path. This ensures that the determined target path is consistent with a target path that is determined based on a global path load status, and also reduces overheads of polling and information storage compared to a solution of determining the target path based on the global path load status.

In an implementable design, m is equal to 2.

In an implementable design, before the determining, based on load statuses of respective probe channels on n paths between a source end and a destination end, a target path with a lightest load in the n paths, the method further includes: determining whether the to-be-transmitted data packet and a transmitted data packet belong to a same scheduling unit; and when the to-be-transmitted data packet and the transmitted data packet do not belong to the same scheduling unit, performing the step of determining, based on load statuses of respective probe channels on n paths between a source end and a destination end, a target path with a lightest load in the n paths.

In an implementable design, the method further includes: when the to-be-transmitted data packet and the transmitted data packet belong to the same scheduling unit, using a target path of the transmitted data packet as a target path of the to-be-transmitted data packet.

In the foregoing solution, when the to-be-transmitted data packet and the transmitted data packet do not belong to the same scheduling unit, the target path with the lightest load in the n paths is determined based on the load statuses of the respective probe channels on the n paths between the source end and the destination end. Additionally, when the to-be-transmitted data packet and the transmitted data packet belong to the same scheduling unit, the target path of the transmitted data packet is used as the target path of the to-be-transmitted data packet. Therefore, data packets that belong to a same scheduling unit are transmitted on a same target path.

In an implementable design, the determining whether the to-be-transmitted data packet and a transmitted data packet belong to a same scheduling unit includes: determining whether the to-be-transmitted data packet and a transmitted data packet that is transmitted within second preset duration belong to a same scheduling unit.

In an implementable design, the scheduling unit includes a data packet, a flow, or a set of a plurality of data packets in a same flow.

In the foregoing solution, the scheduling unit includes a data packet, a flow, or a set of a plurality of data packets in a same flow. Therefore, data packets in a same data packet, a same data flow, or a plurality of data packets in a same data flow are transmitted on a same target path.

According to a second aspect, an embodiment of this application provides a load balancing method, including: receiving a bandwidth probe packet sent by a source end through a probe channel on a target path, where the target path is a path with a lightest load in n paths that is determined by the source end based on load statuses of respective probe channels on the n paths between the source end and a destination end, the probe channel is used to transmit a probe packet, the probe packet includes the bandwidth probe packet, and n is an integer greater than 1; returning the bandwidth probe packet to the source end; and receiving a data packet sent by the source end through a data channel on the target path.

In the foregoing solution, the target path is the path with the lightest load in the n paths that is determined by the source end based on the load statuses of the respective probe channels on the n paths between the source end and the destination end. Therefore, the target path with the lightest load is selected based on the load statuses of the respective probe channels on the n paths, thereby implementing load balancing among a plurality of paths.

In an implementable design, the probe packet further includes a load probe packet. Additionally, before the receiving a bandwidth probe packet sent by a source end through a probe channel on a target path, the method further includes: receiving a load probe packet sent by the source end through a probe channel on each of the n paths; and returning the load probe packet received through the probe channel on each path to the source end.

In the foregoing solution, the load probe packet sent by the source end through the probe channel on each of the n paths is received, and the load probe packet received through the probe channel on each path is returned to the source end. Therefore, the source end can determine a load status of the probe channel on each path based on the load probe packet returned on each path, thereby determining the load status of the probe channel.

In an implementable design, the n paths are in one-to-one correspondence with n path identifiers, and the path identifier is used by an intermediate device to perform routing using a hash algorithm. Additionally, a packet header of the load probe packet that is sent to the destination end through the probe channel on each path includes a path identifier corresponding to a path, where a packet header of the bandwidth probe packet and a packet header of the data packet all include a path identifier corresponding to the target path.

In the foregoing solution, the load probe packet that is sent to the destination end through the probe channel on each path includes a path identifier corresponding to a path, where the packet header of the bandwidth probe packet and the packet header of the data packet all include the path identifier corresponding to the target path. This resolves a problem of complex implementation of a source routing manner.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In the foregoing solution, the n path identifiers include the randomly determined m path identifiers, and the path identifiers respectively correspond to the d paths in all the paths used to determine the target path previously. Therefore, a local optimal solution is used to determine the target path. This ensures that the determined target path is consistent with a target path that is determined based on a global path load status, and also reduces overheads of polling and information storage compared to a solution of determining the target path based on the global path load status.

In an implementable design, m is equal to 2.

According to a third aspect, an embodiment of this application provides a load balancing method, including: receiving a load probe packet sent by a source end; forwarding the load probe packet to a destination end through a probe channel, where the probe channel is used to transmit a probe packet, and where the probe packet includes the load probe packet; receiving the load probe packet returned by the destination end; and forwarding the load probe packet returned by the destination end to the source end.

In the foregoing solution, the load probe packet sent by the source end is received, the load probe packet is forwarded to the destination end through the probe channel, the load probe packet returned by the destination end is received, and the load probe packet returned by the destination end is forwarded to the source end. Therefore, an intermediate device can forward the load probe packet that is sent through the probe channel between the source end and the destination end, and the source end can determine a load status of the probe channel based on the load probe packet.

In an implementable design, the forwarding the load probe packet to a destination end through a probe channel includes: forwarding the load probe packet to the destination end through the probe channel based on a queuing policy.

In the foregoing solution, the load probe packet is forwarded to the destination end through the probe channel based on the queuing policy, such that the source end can use an RTT of the load probe packet returned on each path as load status information of a probe channel on each path.

In an implementable design, the forwarding the load probe packet to a destination end through a probe channel includes: forwarding the load probe packet to the destination end through the probe channel based on a highest priority policy.

In the foregoing solution, the load probe packet is forwarded to the destination end through the probe channel based on the highest priority policy, such that the source end can use an ECN identifier of the load probe packet returned on each path as load status information of a probe channel on each path.

In an implementable design, the forwarding the load probe packet returned by the destination end to the source end includes: forwarding the load probe packet returned by the destination end to the source end based on the highest priority policy.

In the foregoing solution, the load probe packet returned by the destination end is forwarded to the source end based on the highest priority policy. This avoids the following problem: A load status of the probe channel between the source end and the destination end that is determined based on the returned load probe packet is inaccurate due to transmission limitation on the returned load probe packet by the intermediate device.

In an implementable design, a packet header of the load probe packet includes a path identifier; and the forwarding the load probe packet to a destination end through a probe channel includes: forwarding the load probe packet to the destination end through the probe channel based on the path identifier using a hash algorithm.

In the foregoing solution, the load probe packet is forwarded to the destination end through the probe channel based on the path identifier using the hash algorithm. This resolves a problem of complex implementation of a source routing manner.

According to a fourth aspect, an embodiment of this application provides a source end, including: a path determining unit configured to determine, based on load statuses of respective probe channels on n paths between the source end and a destination end, a target path with a lightest load in the n paths, where the probe channel is used to transmit a probe packet that includes a bandwidth probe packet, and where n is an integer greater than 1; a bandwidth probe packet transceiver unit configured to send a bandwidth probe packet to the destination end through a probe channel on the target path, and receive the bandwidth probe packet returned by the destination end; and a data packet transmitting unit configured to send, based on the bandwidth probe packet returned by the destination end, a to-be-transmitted data packet to the destination end through a data channel on the target path.

In an implementable design, the probe packet further includes a load probe packet. Additionally, the source end further includes a load probe packet determining unit configured to: send a load probe packet to the destination end through a probe channel on each of the n paths; receive the load probe packet returned by the destination end; and determine, based on the load probe packet returned on each path, a load status of the probe channel on each path.

In an implementable design, that the load probe packet determining unit is configured to determine, based on the load probe packet returned on each path, a load status of the probe channel on each path includes: using an RTT or an ECN identifier of the load probe packet returned on each path as load status information of the probe channel on each path.

In an implementable design, the load probe packet determining unit is configured to periodically perform the following steps within first preset duration: sending the load probe packet to the destination end through the probe channel on each of the n paths; receiving the load probe packet returned by the destination end; and determining, based on the load probe packet returned on each path, the load status of the probe channel on each path.

In an implementable design, the n paths are in one-to-one correspondence with n path identifiers, and the path identifier is used by an intermediate device to perform routing using a hash algorithm. Additionally, the load probe packet that is sent to the destination end through the probe channel on each path includes a path identifier corresponding to a path, where a packet header of the bandwidth probe packet and a packet header of the data packet all include a path identifier corresponding to the target path.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In an implementable design, m is equal to 2.

In an implementable design, the source end further includes a judging unit configured to determine whether the to-be-transmitted data packet and a transmitted data packet belong to a same scheduling unit; where the path determining unit is configured to: when the to-be-transmitted data packet and the transmitted data packet do not belong to the same scheduling unit, determine the target path in the n paths based on the load statuses of the respective probe channels on the n paths between the source end and the destination end.

In an implementable design, the path determining unit is further configured to: when the to-be-transmitted data packet and the transmitted data packet belong to the same scheduling unit, use a target path of the transmitted data packet as a target path of the to-be-transmitted data packet.

In an implementable design, the judging module is configured to determine whether the to-be-transmitted data packet and a transmitted data packet that is transmitted within second preset duration belong to a same scheduling unit.

In an implementable design, the scheduling unit includes a data packet, a flow, or a set of a plurality of data packets in a same flow.

For beneficial effects of the source end provided in any one of the fourth aspect or the possible implementations of the fourth aspect, refer to the beneficial effects brought by the first aspect and the possible implementations of the first aspect. Details are not described herein again.

According to a fifth aspect, an embodiment of this application provides a destination end, including: a bandwidth probe packet transceiver unit configured to receive a bandwidth probe packet sent by a source end through a probe channel on a target path, where the target path is a path with a lightest load in n paths that is determined by the source end based on load statuses of respective probe channels on the n paths between the source end and the destination end, the probe channel is used to transmit a probe packet that includes the bandwidth probe packet, and n is an integer greater than 1, where the bandwidth probe packet transceiver unit is further configured to return the bandwidth probe packet to the source end; and a data packet receiving unit configured to receive a data packet sent by the source end through a data channel on the target path.

In an implementable design, the probe packet further includes a load probe packet. Additionally, the destination end further includes a load probe packet transceiver unit configured to: receive a load probe packet sent by the source end through a probe channel on each of the n paths; and return the load probe packet received through the probe channel on each path to the source end.

In an implementable design, the n paths are in one-to-one correspondence with n path identifiers, and the path identifier is used by an intermediate device to perform routing using a hash algorithm. Additionally, a packet header of the load probe packet that is sent to the destination end through the probe channel on each path includes a path identifier corresponding to a path, where a packet header of the bandwidth probe packet and a packet header of the data packet all include a path identifier corresponding to the target path.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In an implementable design, m is equal to 2.

For beneficial effects of the destination end provided in any one of the fifth aspect or the possible implementations of the fifth aspect, refer to the beneficial effects brought by the second aspect and the possible implementations of the second aspect. Details are not described herein again.

According to a sixth aspect, an embodiment of this application provides an intermediate device, including: a first receiving unit configured to receive a load probe packet sent by a source end; a first forwarding unit configured to forward the load probe packet to a destination end through a probe channel, where the probe channel is used to transmit a probe packet that includes the load probe packet; a second receiving unit configured to receive the load probe packet returned by the destination end; and a second forwarding unit configured to forward the load probe packet returned by the destination end to the source end.

In an implementable design, the first forwarding unit is configured to: forward the load probe packet to the destination end through the probe channel based on a queuing policy.

In an implementable design, the first forwarding unit is configured to: forward the load probe packet to the destination end through the probe channel based on a highest priority policy.

In an implementable design, the second forwarding unit is configured to: forward the load probe packet returned by the destination end to the source end based on the highest priority policy.

In an implementable design, a packet header of the load probe packet includes a path identifier. Additionally, that the first forwarding unit is configured to forward the load probe packet to a destination end through a probe channel includes: forwarding the load probe packet to the destination end through the probe channel based on the path identifier using a hash algorithm.

For beneficial effects of the intermediate device provided in any one of the sixth aspect or the possible implementations of the sixth aspect, refer to the beneficial effects brought by the third aspect and the possible implementations of the third aspect. Details are not described herein again.

According to a seventh aspect, an embodiment of this application provides a source end, including a processor, a memory, and a communications interface, where the processor is configured to control a transmit and receive action of the communications interface; the memory is configured to store a program. Additionally, the processor is configured to invoke the program stored in the memory, to perform the method according to any one of the first aspect or the possible implementations of the first aspect.

According to an eighth aspect, an embodiment of this application provides a destination end, including a processor, a memory, and a communications interface, where the processor is configured to control a transmit and receive action of the communications interface. The memory is configured to store a program, and the processor is configured to invoke the program stored in the memory, to perform the method according to any one of the second aspect or the possible implementations of the second aspect.

According to a ninth aspect, an embodiment of this application provides an intermediate device, including a processor, a memory, and a communications interface, where the processor is configured to control a transmit and receive action of the communications interface. The memory is configured to store a program, and the processor is configured to invoke the program stored in the memory, to perform the method according to any one of the third aspect or the possible implementations of the third aspect.

According to a tenth aspect, an embodiment of this application provides a communications system, including the source end according to the seventh aspect, the destination end according to the eighth aspect, and the intermediate device according to the ninth aspect.

According to an eleventh aspect, an embodiment of this application provides a storage medium, where the storage medium stores a computer program, and when the computer program is executed by a processor, the method according to any one of the first aspect or the possible implementations of the first aspect is implemented.

According to a twelfth aspect, an embodiment of this application further provides a program product, where the program product includes a computer program (namely, an executable instruction), and the computer program is stored in a readable storage medium. At least one processor of a source end may read the computer program from the readable storage medium, and the at least one processor executes the computer program, such that the source end implements the method provided in the first aspect.

According to a thirteenth aspect, an embodiment of this application provides a storage medium, where the storage medium stores a computer program, and when the computer program is executed by a processor, the method according to any one of the second aspect or the possible implementations of the second aspect is implemented.

According to a fourteenth aspect, an embodiment of this application further provides a program product, where the program product includes a computer program (namely, an executable instruction), and the computer program is stored in a readable storage medium. At least one processor of a destination end may read the computer program from the readable storage medium, and the at least one processor executes the computer program, such that the destination end implements the method provided in the second aspect.

According to a fifteenth aspect, an embodiment of this application provides a storage medium, where the storage medium stores a computer program, and when the computer program is executed by a processor, the method according to any one of the third aspect or the possible implementations of the third aspect is implemented.

According to a sixteenth aspect, an embodiment of this application further provides a program product, where the program product includes a computer program (namely, an executable instruction), and the computer program is stored in a readable storage medium. At least one processor of an intermediate device may read the computer program from the readable storage medium, and the at least one processor executes the computer program, such that the intermediate device implements the method provided in the third aspect.

DESCRIPTION OF EMBODIMENTS

Figure 1A:
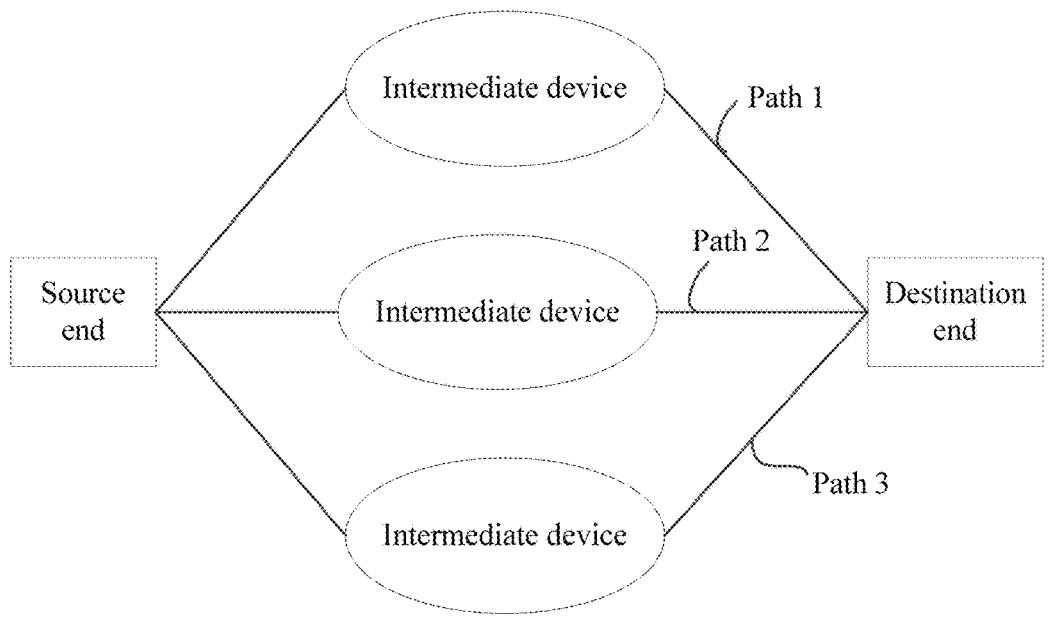
FIG. 1A is a schematic diagram 1 of an application architecture according to an embodiment of this application.

The embodiments of this application are applied to an application architecture in which there are a plurality of paths between a source end and a destination end. For example, there are three paths between the source end and the destination end. A schematic diagram of the application architecture according to an embodiment of this application may be shown in FIG. 1A. A path that is from the source end to the destination end through an intermediate device 1 may be a path 1, a path that is from the source end to the destination end through an intermediate device 2 may be a path 2, and a path that is from the source end to the destination end through an intermediate device 3 may be a path 3. It should be noted that, in FIG. 1A, an example in which each path passes through one intermediate device is used. It can be understood that a quantity of intermediate devices through which each path passes is not limited in the embodiments of this application. Quantities of intermediate devices through which a plurality of paths pass may be completely the same, or may be partially the same, or may be different.

Optionally, the intermediate device may be, for example, a router, a switch, or another switching device.

Figure 1B:
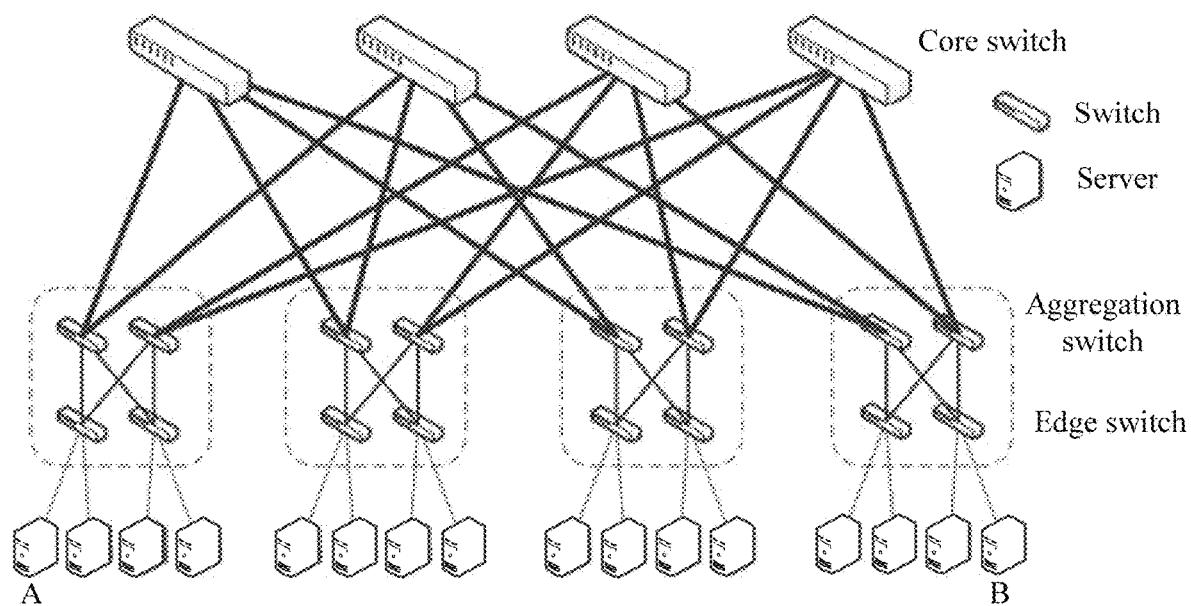
FIG. 1B is a schematic diagram 2 of an application architecture according to an embodiment of this application.

Optionally, the application architecture according to the embodiments of this application may be a data center network (DCN) shown in FIG. 1B. For example, in FIG. 1B, a server A may be used as a source end, a server B may be used as a destination end, and an edge switch, an aggregation switch, and a core switch may be used as intermediate devices.

In the application architecture in which there are a plurality of paths between the source end and the destination end shown in FIG. 1A, the embodiments of this application are mainly applied to a scenario in which for each of the plurality of paths, transmission channels between the source end and the destination end are classified into a data channel and a probe channel based on a proportion, and a data packet rate on the data channel is adjusted based on a packet loss rate of a bandwidth probe packet limited by the probe channel, or the like. The probe channel may be used to transmit a probe packet, the probe packet may include the bandwidth probe packet, and the data channel may be used to transmit a data packet. It should be noted that, that the transmission channels are classified into the probe channel and the data channel herein may be logical classification. Optionally, a reserved bandwidth of an egress port of the intermediate device between the source end and the destination end may form the probe channel, and a non-reserved bandwidth of the egress port of the intermediate device between the source end and the destination end may form the data channel. For example, the intermediate device may reserve a buffer for the probe packet to buffer burst probe packets. The egress port of the intermediate device may be used to limit a rate of the probe packet based on a proportion of a bandwidth and discard a probe packet that is transmitted exceeding the proportion of the bandwidth. A normal data packet may be transmitted using a link bandwidth not counted in the proportion of bandwidth used by the probe packet. In addition, because the rate of the bandwidth probe packet is adjusted, a transmission rate of the data packet based on the rate of the bandwidth probe packet may be just appropriate. It can be learned that, in the embodiments of this application, the bandwidth probe packet may be used to probe an available bandwidth.

Optionally, the source end may send the bandwidth probe packet (for example, a Credit packet) to the destination end through the probe channel, to adjust a rate of the bandwidth probe packet, and adjust, based on the rate of the bandwidth probe packet, a transmit rate of the data packet transmitted through the data channel. The intermediate device may be responsible for normally transmitting the data packet, and reserving a link bandwidth for transmitting the probe packet. It should be noted that, a manner of adjusting the data packet rate on the data channel based on the packet loss rate of the bandwidth probe packet limited by the probe channel, and the like is not limited in the embodiments of this application.

Figure 1C:
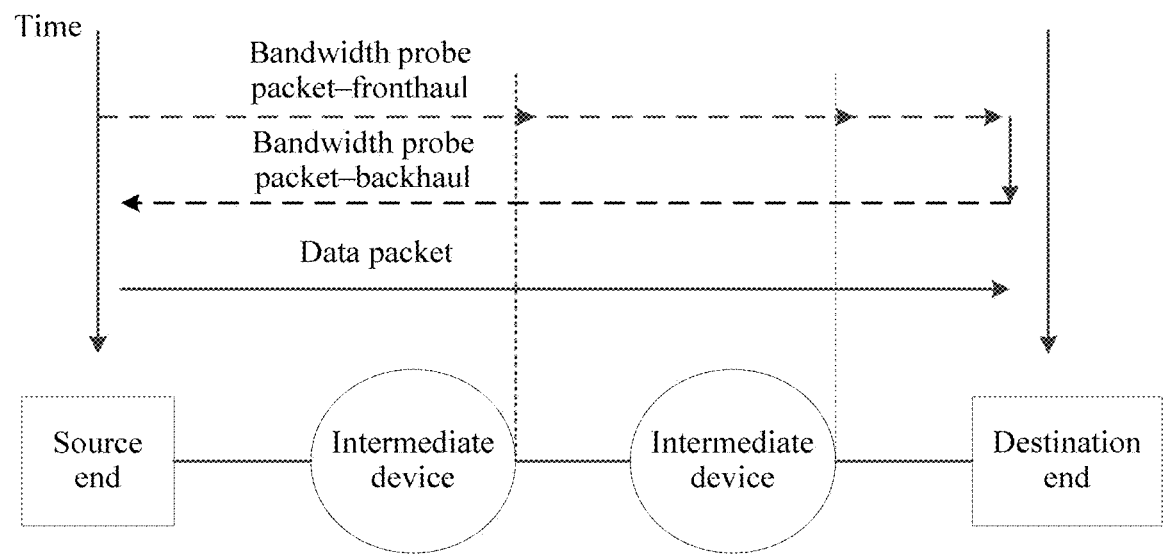
FIG. 1C is a schematic diagram 1 of packet sending according to an embodiment of this application.
Figure 1D:
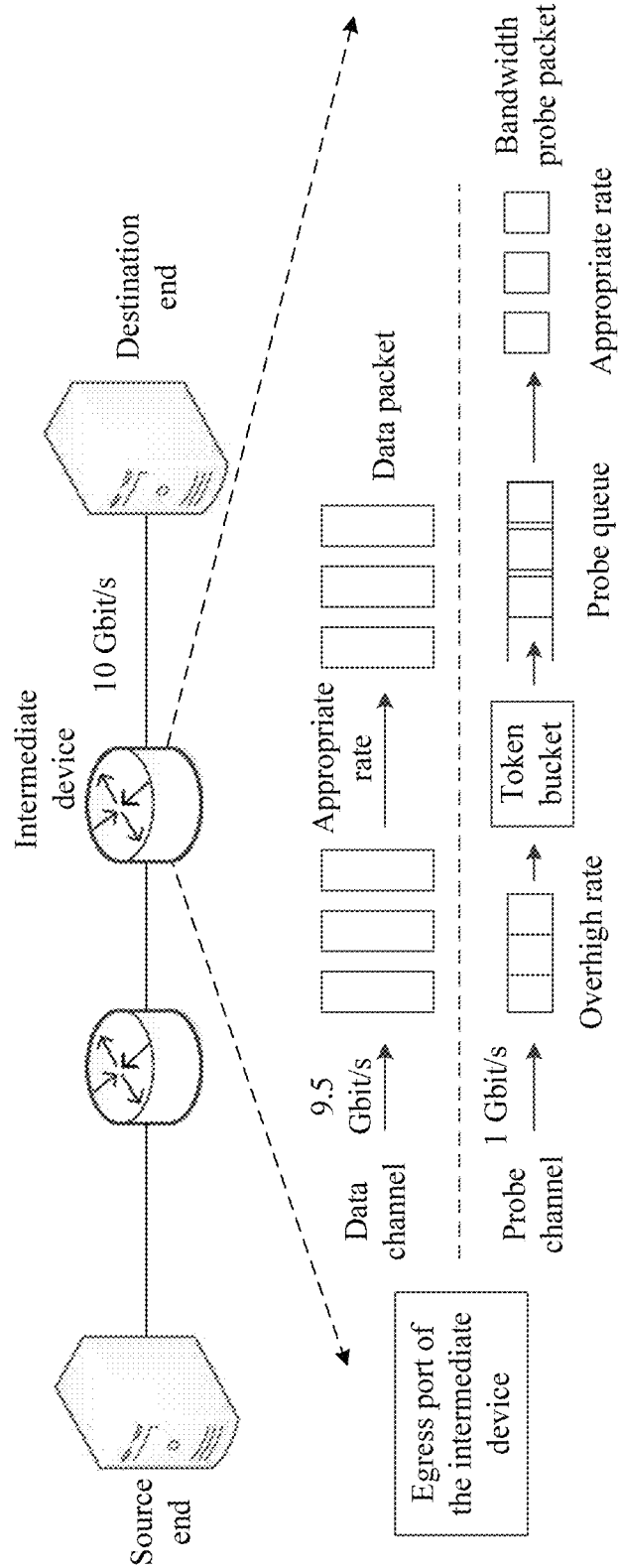
FIG. 1D is a schematic diagram 2 of packet sending according to an embodiment of this application.

For example, as shown in FIG. 1C, in step 1, the source end may send a bandwidth probe packet (namely, a bandwidth probe packetfronthaul) to the destination end, and the bandwidth probe packet may be encapsulated using a minimum Ethernet frame of 64 bytes, and may include Transmission Control Protocol (TCP)/Internet Protocol (TCP/IP) header information, a fronthaul flag bit, a backhaul flag bit, or the like. In step 2, an egress port of an intermediate device in each hop may be used to limit a rate of a probe packet based on a bandwidth proportion (for example, 5%), and discard a probe packet that exceeds a port capability. In step 3, the destination end may exchange a source address and a destination address of the received bandwidth probe packet and transmit the bandwidth probe packet (namely, a bandwidth probe packet-backhaul) back to the source end, and the rate of the bandwidth probe packet may not be limited in a return trip. In step 4, the source end may send a data packet based on the rate of the bandwidth probe packet that is transmitted back, for example, the source end may immediately send a corresponding data packet each time one probe packet is received. It is assumed that a bandwidth proportion of the probe channel to the data channel is 1:19, in step 2, a process of transmitting the data packet and the bandwidth probe packet through the egress port of the intermediate device may be shown in FIG. 1D. For example, when a rate at which the source end sends the bandwidth probe packet is 1 gigabit per second (Gbit/s), a packet loss rate of 50% occurs due to a limitation of a probe queue, and it can be determined that an appropriate rate of the bandwidth probe packet should be 0.5 Gbit/s. Because the bandwidth proportion of the probe channel to the data channel is 1:19, it may be further determined that an appropriate data packet rate is 9.5 Gbit/s. It should be noted that in FIG. 1D, and the following FIG. 3A and FIG. 3B, an example in which a rate limiting algorithm of the intermediate device is a token bucket algorithm is used.

Figure 2:
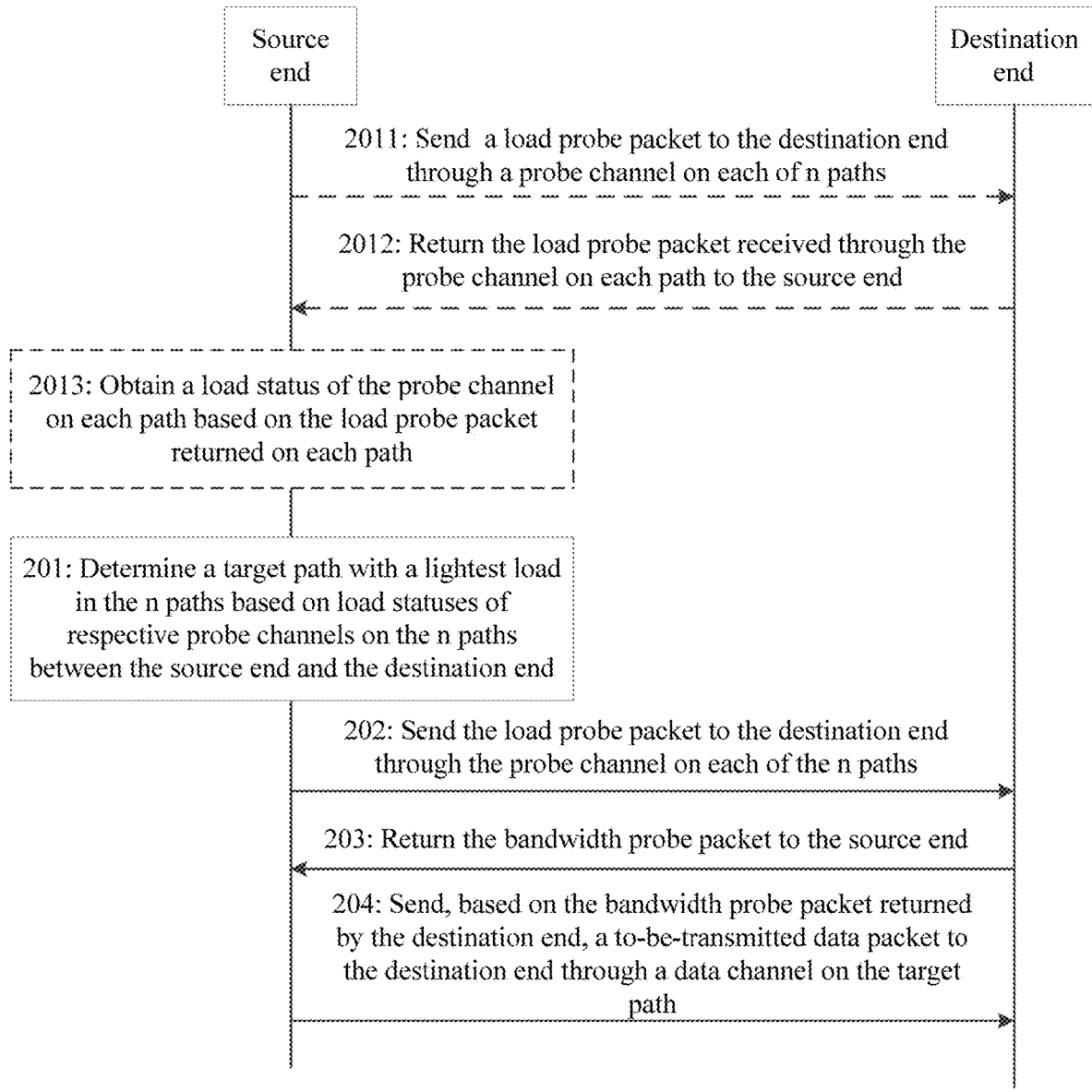
FIG. 2 is a flowchart of Embodiment 1 of a load balancing method according to an embodiment of this application.

FIG. 2 is a flowchart of Embodiment 1 of a load balancing method according to an embodiment of this application. As shown in FIG. 2, the method according to this embodiment may include the following steps.

Step 201: A source end determines, based on load statuses of respective probe channels on n paths between the source end and a destination end, a target path with a lightest load in the n paths.

In this step, the probe channel is used to transmit a probe packet, the probe packet includes a bandwidth probe packet, and n is an integer greater than 1. The load status may be used to indicate a load size, a load degree, or the like of the probe channel. In a scenario in which transmission channels are classified into a probe channel and a data channel, and a data packet rate on the data channel is adjusted based on a packet loss rate of the bandwidth probe packet limited by the probe channel, because a load status of the probe channel may reflect a load status of the data channel, the target path with the lightest load in the n paths may be determined based on the load statuses of the respective probe channels of the n paths, and both a probe channel and a data channel on the target path have lightest loads.

It should be noted that the n paths may be all or some paths between the source end and the destination end. This is not limited in this application.

It should be noted that a manner of obtaining the load status of the probe channel by the source end is not limited in this embodiment of this application. For example, the source end may determine the load status of the probe channel based on the packet loss rate or an RTT of the bandwidth probe packet transmitted on the probe channel.

Optionally, the probe packet may further include a load probe packet. Correspondingly, the load status of the probe channel may be determined by transmitting the load probe packet on the probe channel. Therefore, further, before step 201, the following step 2011 to step 2013 may be included.

Step 2011: The source end sends a load probe packet to the destination end through a probe channel on each of the n paths.

Because there is an intermediate device between the source end and the destination end, for one of the n paths, step 2011 may include: sending, by the source end, the load probe packet to an intermediate device on the path through a probe channel on the path, and the intermediate device on the path forwards the load probe packet to the destination end. It should be noted that, for the n paths, the load probe packet may be sent to the destination end through the probe channel on each path in a polling manner. This is not limited in this application. Optionally, in a scenario in which both a bandwidth probe packet a and a load probe packet b are transmitted on the probe channel of the intermediate device, a description of forwarding the load probe packet by the intermediate device may be, for example, shown in FIG. 3A or FIG. 3B. Herein, the bandwidth probe packet a may be a probe packet that is transmitted earlier than the load probe packet b.

Figure 3A:
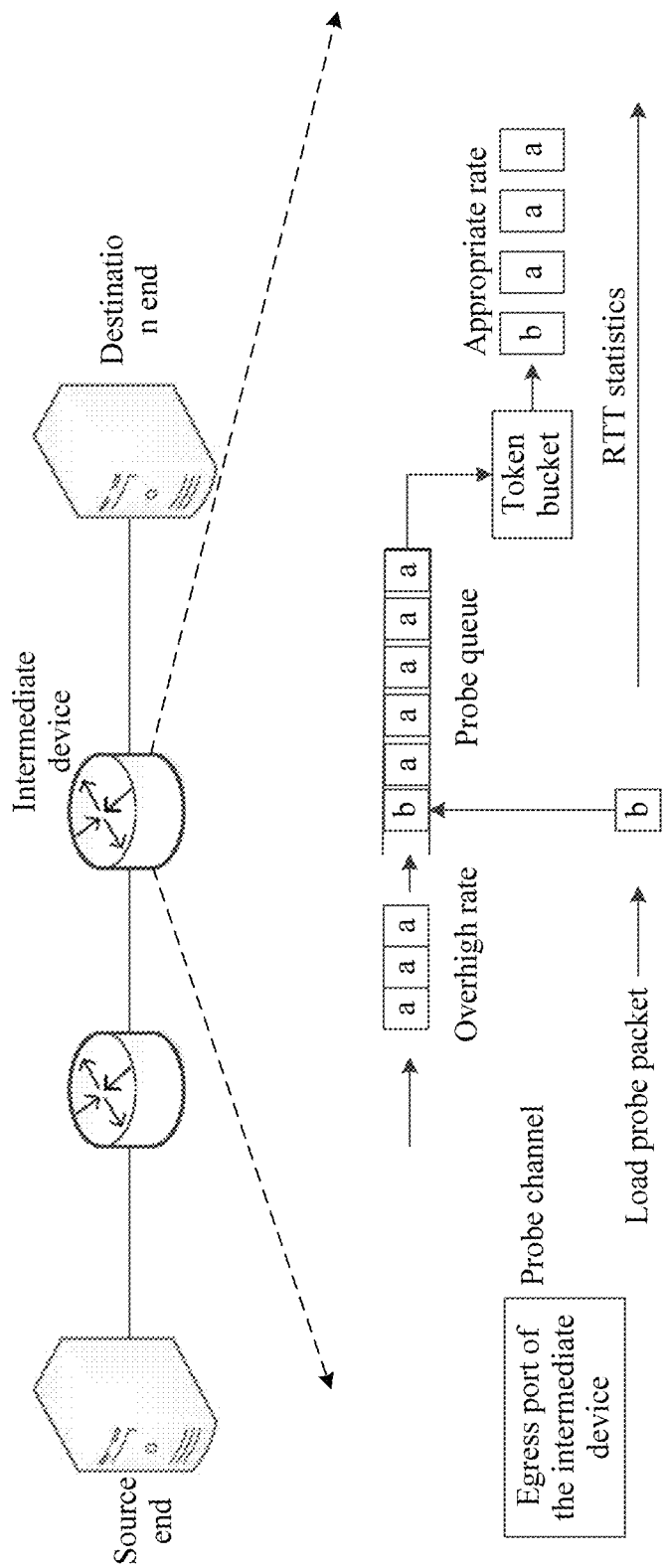
FIG. 3A is a schematic diagram 3 of packet sending according to an embodiment of this application.

Optionally, the intermediate device may forward the load probe packet to the destination end through the probe channel based on a queuing policy. As shown in FIG. 3A, after receiving the load probe packet b, the intermediate device may, for example, perform the following operations: if a packet is stacked in a probe queue but the probe queue is not full, putting the load probe packet b into the probe queue in a first-in-first-out order for sending; if the probe queue is full, discarding the load probe packet b; and if no packet is stacked in the probe queue, forwarding the load probe packet b. Correspondingly, the load status of the probe channel may be represented based on the RTT of the load probe packet.

Figure 3B:
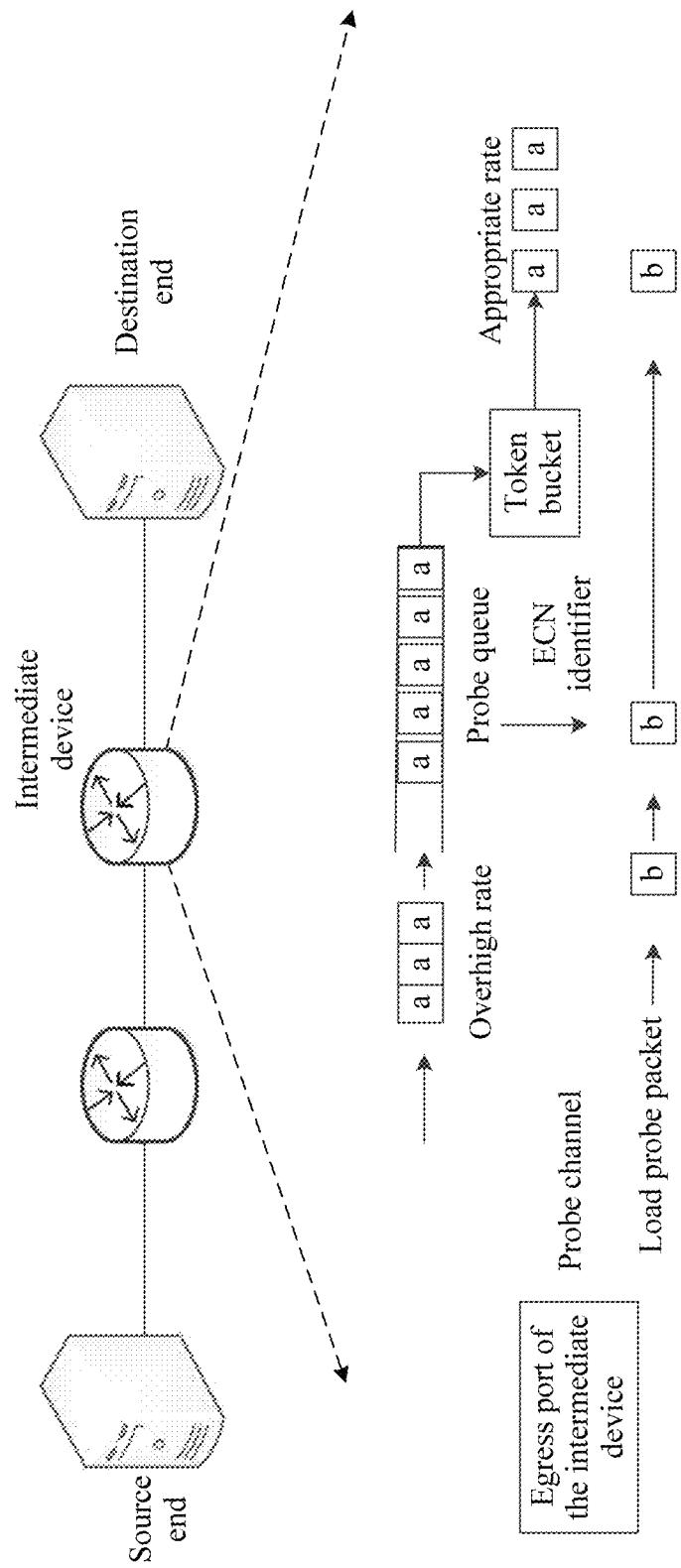
FIG. 3B is a schematic diagram 4 of packet sending according to an embodiment of this application.

Optionally, the intermediate device may forward the load probe packet to the destination end through the probe channel based on a highest priority policy. As shown in FIG. 3B, after receiving the load probe packet b, the intermediate device may, for example, perform the following operations: (1) determining a packet stacking status of a probe queue of the probe channel, and if the stacking status of the probe queue of the probe channel reaches a preset degree (for example, stacking occurs), setting an ECN position in a packet header of the load probe packet b to 1; or if the stacking status of the probe queue of the probe channel does not reach a preset degree (for example, no stacking occurs), setting an ECN position of the load probe packet b to 0; (2) forwarding the load probe packet b with an updated packet header at a highest priority. Correspondingly, the load status of the probe channel may be represented based on an ECN identifier of the load probe packet. It should be noted that, if the stacking status of the probe queue in the probe channel does not reach the preset degree, the received load probe packet b may also be directly forwarded at the highest priority.

Optionally, the source end may send the load probe packet to the destination end through the probe channel on each of the n paths in a source routing manner. For example, for one of the n paths, the source end needs to calculate all intermediate devices through which the path passes, and add routing information of the path to a packet header of the load probe packet, such that the intermediate devices can perform routing based on the routing information, and the source end can send the load probe packet to the destination end through a probe channel on the path. It can be learned that, implementation of the source routing manner is complex.

For a problem of the complex implementation of source routing, optionally, the n paths are in one-to-one correspondence with n path identifiers, and the path identifier is used by the intermediate device to perform routing using a hash algorithm, and the load probe packet that is sent to the destination end through the probe channel on each path includes a path identifier corresponding to a path. Correspondingly, that the intermediate device forwards the load probe packet to the destination end through the probe channel may include: forwarding the load probe packet to the destination end through the probe channel based on the path identifier using the hash algorithm. Optionally, a hash function input of a conventional routing algorithm (for example, using a shortest path (Equal Cost Multi path Routing (ECMP) algorithm to a maximum extent) may be extended, based on a conventional hash function calculated based on a 5-tuple (a source IP address, a destination IP address, a source port, a destination port, and a transport layer protocol), a new input parameter (namely, a path identifier, for example, a time to live (TTL)) is introduced, and mapping of an egress port is performed based on six parameters. Results obtained using different path identifiers as input parameters of the hash function are different, and mapped egress ports are different. Therefore, the n path identifiers may be used to distinguish between the n paths.

Step 2012: The destination end returns the load probe packet received through the probe channel on each path to the source end.

Optionally, for one of the n paths, step 2012 may include: returning, by the destination end, the load probe packet received through the path to the intermediate device, and forwarding, by the intermediate device, the load probe packet to the source end. Optionally, the destination end may return, to the source end through the original path, the load probe packet received through the probe channel on each path, or may return the load probe packet to the source end through another path. This is not limited in this application.

Optionally, the destination end may exchange a source address and a destination address of the load probe packet, and then return the load probe packet to the source end.

Optionally, to avoid a problem that the load status of the probe channel between the source end and the destination end that is determined based on the returned load probe packet is inaccurate due to transmission limitation on the returned load probe packet by the intermediate device, the intermediate device may not limit a rate of the returned load probe packet. Optionally, the intermediate device may forward the load probe packet returned by the destination end to the source end based on the highest priority policy.

Step 2013: The source end determines, based on the load probe packet returned on each path, a load status of the probe channel on each path.

It can be learned that, in this embodiment of this application, the load probe packet may be used to probe a load status.

Optionally, when the intermediate device forwards the load probe packet according to the method shown in FIG. 3A, step 2013 may include: using an RTT of the load probe packet returned on each path as load status information of the probe channel on each path. For example, a greater RTT of the load probe packet returned on the path may indicate a heavier load of the path, and a smaller RTT of the load probe packet returned on the path may indicate a lighter load of the path.

When the intermediate device forwards the load probe packet according to the method shown in FIG. 3B, step 2013 may include: using an ECN identifier of the load probe packet returned on each path as load status information of the probe channel on each path. For example, when the ECN identifier of the load probe packet returned on the path is 1, it may indicate that a load of the path is relatively heavy; and when the ECN identifier of the load probe packet returned on the path is 0, it may indicate that the load of the path is relatively light.

It should be noted that, when a buffer of the probe channel is relatively large, a method of using the RTT of the load probe packet returned on each path as the load status information of the probe channel on each path has a good effect. However, when a buffer of the probe channel is relatively small (for example, only two probe packets are buffered), an RTT difference of transmitting the load probe packet through the probe channel may not be clear, and a load of the probe channel obtained using a delay-based probe method may be inaccurate. In this case, a method of using the ECN of the load probe packet returned on each path as the load status information of the probe channel on each path may be used. This method can eliminate a negative impact caused by a delay-based probe error on determining a path load status. When a buffer of the probe channel is relatively small, this method can determine the path load status more accurately, but a result is less accurate than obtained by the delay-based load probe method.

Optionally, because a load status is time-effective, in this embodiment, the load statuses of the respective probe channels on the n paths may be periodically updated within first preset duration. For example, step 2011 to step 2013 may be periodically performed within the first preset duration. Optionally, the first preset duration may be greater than or equal to the RTT.

Optionally, n may be equal to a total quantity of paths between the source end and the destination end. In this case, the source end sends the load probe packet to the destination end through the probe channel on each of all paths between the source end and the destination end. In other words, the source end may determine the target path based on a global path load status. Alternatively, optionally, n may be less than a total quantity of paths between the source end and the destination end. In this case, the source end sends the load probe packet to the destination end through the probe channel on each of some paths between the source end and the destination end. In other words, the source end may determine the target path based on a local path load status. Compared with determining the target path based on the global path load status, determining the target path based on the local path load status can reduce overheads of polling and information storage.

Figure 4:
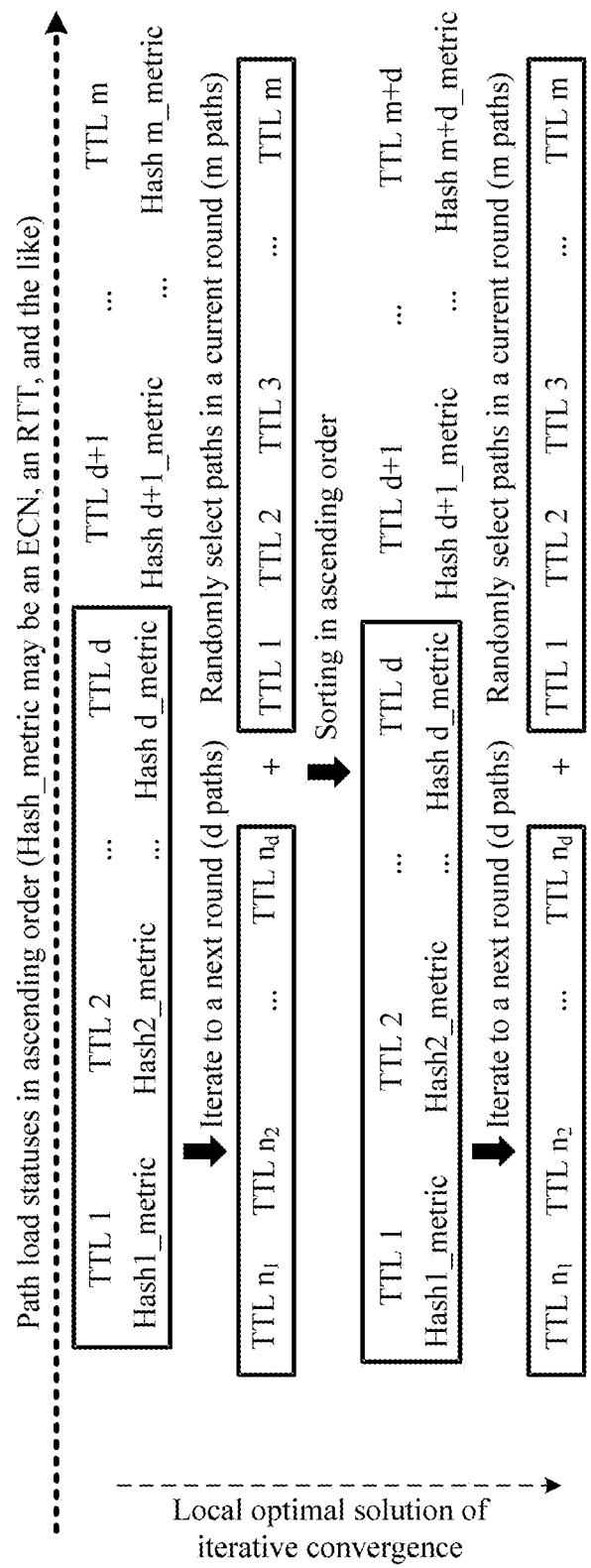
FIG. 4 is a schematic diagram of an iterative optimization process of a local optimal solution according to an embodiment of this application.

Optionally, when the source end determines the target path based on the local path load status, to ensure that determining the target path based on the local path load status can be consistent with determining the target path based on the global path load status as much as possible, a local optimal solution manner may be used to determine the n paths. Optionally, the n path identifiers may include randomly determined m path identifiers, and path identifiers respectively corresponding to d paths in all paths used to determine the target path (for example, a target path determined last time), where n is greater than or equal to m and is less than or equal to m+d, and loads of the d paths are less than or equal to a load of another path in all the paths. It should be noted that, because the n path identifiers are in one-to-one correspondence with the n paths, the n path identifiers should be different from each other. In addition, because the randomly determined m path identifiers may include all or some of the d path identifiers respectively corresponding to the d paths, or may not include the d path identifiers, n may be greater than or equal to m and is less than or equal to m+d. Optionally, the previously determined target path may be a target path determined last time, and correspondingly, the d paths in all the paths used to determine the target path previously may be understood as a local optimal solution of a previous round. When a path identifier is a TTL, an iterative optimization process of the local optimal solution may be shown in FIG. 4. It should be noted that, in FIG. 4, hashi_metric may represent a load status of a path i, and a smaller value may indicate a lighter load; and TTLi may indicate a path identifier of the path i, where i may be equal to 1, 2, 3, . . . .

Optionally, m may be equal to 2.

Optionally, d may be equal to 1.

In the following, convergence of the target path obtained through the local optimal solution (to be more specific, the target path obtained through the local optimal solution may tend to be consistent with the target path determined based on the global path load status) can be theoretically proved with reference to a queuing theory model and a Lyapunov drift function.

Related model parameters of the theory are defined as follows.

M is a quantity of ingress ports of an intermediate device.

N is a quantity of egress ports of the intermediate device (or may be understood as a quantity of output queues of the intermediate device).

$\delta_i$ is an average input rate of data at the $i^{th}$ input end.

$\lambda_j$ $\lambda_j$ is an average input rate of data at the $j^{th}$ output end.

$\mu_j$ $\mu_j$ is an average data processing rate of data at the $j^{th}$ output end.

$q_k(t)$ is a length of the $k^{th}$ output queue at a t moment.

$\bar{q}_i(t)\bar{q}_i(t)$ is a length of an output queue selected by the $i^{th}$ output end at a t moment.

$q^*(t)$ $q^*(t)$ is a length of a shortest queue in a system of N output queues of the intermediate device.

K is a quantity of data units that are allowed to be concurrently received at a same moment by each output queue.

It should be noted that, for simplification, in a proving process, it is assumed that quantities of ingress ports of all intermediate devices are the same, and that quantities of egress ports of all the intermediate devices are also the same.

Figure 5:
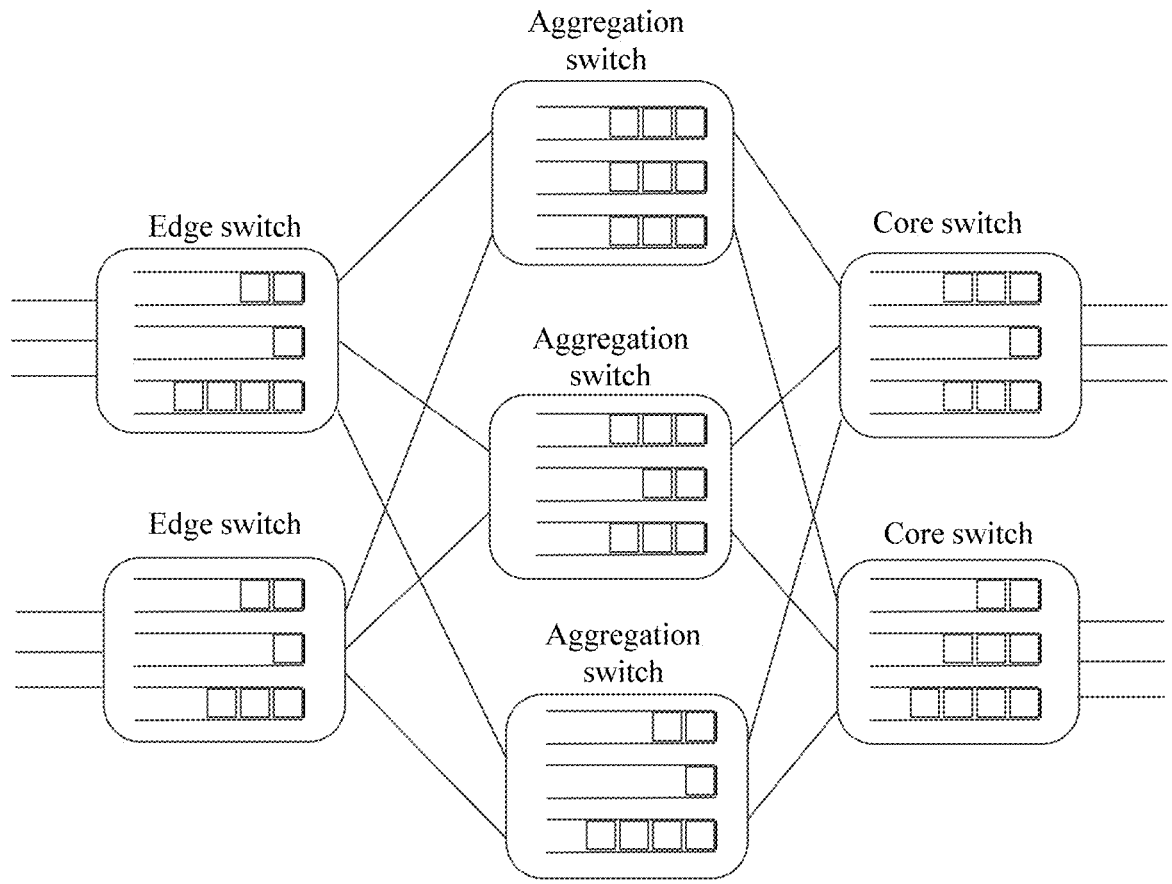
FIG. 5 is a queuing network model according to an embodiment of this application.

For example, in a data center network, a transmission process of a packet on a path may be abstracted as a queuing network model shown in FIG. 5. An egress port buffer of each intermediate device may be abstracted as a sub-queue. A process in which one packet is sent from a source end, passes through intermediate devices at multiple hops, and arrives at a destination end may be abstracted as a multi-queue serial queuing model.

In a case of a slowest convergence speed: d=m=1 (which may be referred to as a (1, 1) policy hereinafter), if a system is stable in this case, the system is also stable in another case of a faster convergence speed. It is assumed that a maximum of only one unit of data is processed in each queue at each time point. Based on a result of the queuing theory model, at any moment, a probability that there is data arriving at the $i^{th}$ input end is:

$$\frac{\delta_i}{\sum_{i=1}^{M} \delta_i + \sum_{j=1}^{N} \mu_j}.$$

Similarly, a probability that there is data leaving the $j^{th}$ output end is:

$$\frac{\mu_j}{\sum_{i=1}^{M} \delta_i + \sum_{j=1}^{N} \mu_j}.$$

It is assumed that in the (1, 1) policy, a probability of selecting a global optimal solution ($\bar{q}_i(t)=q^*(t)$) each time is at least 1/N. Each output end accommodates a maximum of simultaneously scheduled K data units. Therefore, if there are more than K data units, data is discarded. Therefore, the following formula is obtained:

$$\sum_{i=1}^{M} \lambda_i \leq \sum_{i=1}^{M} \delta_i.$$

Similarly, a probability that there is data scheduled to an output queue j at any moment is:

$$\frac{\lambda_j}{\sum_{i=1}^{M} \delta_i + \sum_{j=1}^{N} \mu_j}.$$

It is assumed that in this embodiment of this application, if a record (d=0) of a previous round of a local optimal solution is not introduced, a scheduling policy is not converged. A proving process is as follows.

The $n^{th}$ output queue is examined. For any input port, a maximum probability that input data is scheduled to the $n^{th}$ output queue is: d/N. Therefore, a maximum possible input rate of the $n^{th}$ output queue is:

$$\sum_{i=1}^{M} \delta_i \cdot \frac{d}{N}.$$

For remaining M−1 queues, the minimum sum of input rates is:

$$\sum_{i=1}^{M} \delta_i \cdot \left(1 - \frac{d}{N}\right).$$

If the following formula is true, based on the result of the queuing theory model, it can be proved that an entire system is unstable:

$$\eta_{N-1} = \sum_{i=1}^{M} \delta_i \left(1 - \frac{d}{N}\right) > \sum_{j=1}^{N-1} \mu_j.$$

Input and output rates meet only the following formula:

$$\sum_{i=1}^{M} \delta_i \le \sum_{j=1}^{N} \mu_j.$$

Specific average value distribution may be uneven. Therefore, distribution of a group of input and output rates is found to meet the following formula:

$$\begin{cases} \sum_{i=1}^{M} \delta_i \le \sum_{j=1}^{N} \mu_j \\ \sum_{i=1}^{M} \delta_i \left(1 - \frac{d}{N}\right) > \sum_{j=1}^{N} \mu_j - \mu_N \end{cases} \Leftrightarrow$$

Formula (1)

$$\mu_N > \frac{d}{N} \cdot \sum_{i=1}^{M} \delta_i + \sum_{j=1}^{N} \mu_j - \sum_{i=1}^{M} \delta_i.$$

It is possible to construct distribution of input and output average rates that meets Formula (1). In this case, a subsystem formed by the first N−1 queues is unstable. Therefore, the entire system is unstable.

The following continues to prove that an entire load balancing policy is convergent when a record (d>0) of a local optimal solution of the previous round of scheduling is introduced.

A quadratic Lyapunov function V is constructed, and stability of an algorithm is demonstrated by proving that the Lyapunov function has a negatively expected single-step drift. The Lyapunov function is constructed as follows:

$$V(t) = \sum_{i=1}^{N} (\overline{q}_i(t) - q^*(t))^2 + \sum_{i=1}^{N} q_i(t)^2.$$

The following proves that there exists ε>0,k>0 such that:

$$E[V(t+1) - V(t) | V(t)] \varepsilon V(t) + k.$$

Each output end accommodates a maximum of simultaneously scheduled K data units at a same moment. Therefore, the following formula is obtained:

$$\overline{q}_i(t+1) - \overline{q}_i(t) \le K \quad \text{Formula (2)}.$$

In addition, each queue can output a maximum of one data unit at a same moment. Therefore, the following formula is obtained:

$$q^*(t) - q^*(t+1) \le 1 \quad \text{Formula (3)}.$$

With reference to Formula (2), Formula (3) is also as follows:

$$\overline{q}_i(t+1) - q^*(t+1) \overline{q}_i(t) - q^*(t) + K + 1 \quad \text{Formula (4)}.$$

For the first term of the Lyapunov function, set $$V_1(t) = \sum_{i=1}^{N} (\overline{q}_i(t) - q^*(t))^2,$$

then, (a probability that data is scheduled to an output queue i is multiplied by the square of a queue length difference) is as follows:

$$E[V_1(t+1) - V_1(t) | V_1(t)] = \frac{1}{\sum_{i=1}^{M} \delta_i + \sum_{i=1}^{N} \mu_i} \cdot \frac{1}{N} \times$$

$$\sum_{i=1}^{N} \delta_i \times [(\overline{q}_i(t+1) - q^*(t+1))^2 - (\overline{q}_i(t) - q^*(t))^2] +$$

$$\sum_{i=1}^{N} \left(1 - \frac{\delta_i}{\sum_{i=1}^{M} \delta_i + \sum_{i=1}^{N} \mu_i} \cdot \frac{1}{N}\right) \times$$

$$[(\overline{q}_i(t+1) - q^*(t+1))^2 - (\overline{q}_i(t) - q^*(t))^2].$$

Formula (5)

Substitute Formula (4) to Formula (5) to scale the Lyapunov function, and find the following:

$$E[V_1(t+1) - V_1(t) | V_1(t)] \le -\frac{1}{\sum_{i=1}^{M} \delta_i + \sum_{j=1}^{N} \mu_j} \cdot \frac{1}{N} \times \sum_{i=1}^{M} \delta_i (\overline{q}_i(t) - q^*(t))^2 +$$

$$\sum_{i=1}^{N} [2(\overline{q}_i(t) - q^*(t)) + K + 1] \le$$

$$-\frac{1}{\sum_{i=1}^{M} \delta_i + \sum_{j=1}^{N} \mu_j} \cdot \frac{1}{N} \times \sum_{i=1}^{M} \delta_i (\overline{q}_i(t) - q^*(t))^2 +$$

$$\sum_{i=1}^{N} \left[2\sqrt{(\overline{q}_i(t) - q^*(t))^2} + K + 1\right].$$

The upper bound of the first term of the Lyapunov function is as follows:

$$E[V_1(t+1) - V_1(t) \mid V_1(t)] \leq \quad \text{Formula (6)}$$

$$-\frac{1}{\sum_{i=1}^{M}\delta_i + \sum_{j=1}^{N}\mu_j} \cdot \frac{1}{N} \times \sum_{i=1}^{M}\delta_1(\overline{q}_i(t) - q^*(t))^2 +$$

$$\sum_{i=1}^{N}\left[2\sqrt{(\overline{q}_i(t) - q^*(t))^2}\right] + NK + N.$$

The following continues to examine the second term of the Lyapunov function. Set $$V_2(t) = \sum_{i=1}^{N} q_i(t)^2,$$

and find the following:

$$E[V_2(t+1) - V_2(t) \mid V_2(t)] = \quad \text{Formula (7)}$$

$$\sum_{i=1}^{N}\frac{\lambda_i}{\sum_{i=1}^{M}\delta_i + \sum_{j=1}^{N}\mu_j} \times (q_i(t+1) - q_i(t))^2 +$$

$$\sum_{i=1}^{N}\frac{\mu_i}{\sum_{i=1}^{M}\delta_i + \sum_{j=1}^{N}\mu_j} \times (q_i(t+1) - q_i(t))^2.$$

To facilitate subsequent deduction, a special case M=N is examined. Based on the queuing model, the following formula is obtained:

$$\sum_{i=1}^{N}\lambda_i \times q_i(t) \leq \sum_{i=1}^{N}\delta_i \times \overline{q}_i(t). \quad \text{Formula (8)}$$

Substitute Formula (8) to Formula (7) to further scale the Lyapunov function, and find the following:

$$E[V_2(t+1) - V_2(t) \mid V_2(t)] \leq$$

$$\frac{\sum_{i=1}^{N}\delta_i}{\sum_{i=1}^{N}\delta_i + \sum_{j=1}^{N}\mu_j} \times (2\overline{q}_i(t) + 1) + \frac{\sum_{i=1}^{N}\mu_i}{\sum_{i=1}^{N}\delta_i + \sum_{j=1}^{N}\mu_j} \times (-2q_i(t) + 1) =$$

$$\frac{1}{\sum_{i=1}^{N}\delta_i + \sum_{j=1}^{N}\mu_j} \times \left[\sum_{i=1}^{N}\delta_i \times \left(2\sqrt{(\overline{q}_i(t) - q^*(t))^2} + 2q^*(t)\right) + \sum_{i=1}^{N}\mu_i - 2\sum_{i=1}^{N}\mu_i q_i(t)\right] = \frac{1}{\sum_{i=1}^{N}\delta_i + \sum_{j=1}^{N}\mu_j} \times \left[\sum_{i=1}^{N}\delta_i \times \left(1 + 2\sqrt{(\overline{q}_i(t) - q^*(t))^2}\right) + \right.$$

-continued $$\left. 2q^*(t)\left(\sum_{i=1}^{N}\delta_i - \sum_{i=1}^{N}\mu_i\right) + 2\sum_{i=1}^{N}\mu_i(q^*(t) - q_i(t))\right].$$

After further deduction, the following formula is obtained:

$$E[V_2(t+1) - V_2(t) \mid V_2(t)] \leq \quad \text{Formula (9)}$$

$$\frac{\sum_{i=1}^{N}\delta_i}{\sum_{i=1}^{N}\delta_i + \sum_{j=1}^{N}\mu_j} + \frac{2\sum_{i=1}^{N}\delta_1\sqrt{(\overline{q}_i(t) - q^*(t))^2}}{\sum_{i=1}^{N}\delta_i + \sum_{j=1}^{N}\mu_j} +$$

$$\frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} + \frac{2\sum_{i=1}^{N}\mu_i(q^*(t) - q_i(t))}{\sum_{i=1}^{N}\delta_i + \sum_{j=1}^{N}\mu_j}.$$

With reference to Formula (6) and Formula (9), the following formula is obtained:

$$E[V(t+1) - V(t) \mid V(t)] =$$

$$E[V_1(t+1) - V_1(t) \mid V_1(t)] + E[V_2(t+1) - V_2(t) \mid V_2(t)] \leq$$

$$\frac{\sum_{i=1}^{N}\delta_i}{\sum_{i=1}^{N}\delta_i + \sum_{j=1}^{N}\mu_j} + \frac{2\sum_{i=1}^{N}\delta_1\sqrt{(\overline{q}_i(t) - q^*(t))^2}}{\sum_{i=1}^{N}\delta_i + \sum_{j=1}^{N}\mu_j} + \frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} +$$

$$\frac{2\sum_{i=1}^{N}\mu_i(q^*(t) - q_i(t))}{\sum_{i=1}^{N}\delta_i + \sum_{j=1}^{N}\mu_j} - \frac{\sum_{i=1}^{M}\delta_i(\overline{q}_i(t) - q^*(t))^2}{\sum_{i=1}^{M}\delta_i + \sum_{j=1}^{N}\mu_j} \cdot \frac{1}{N} +$$

$$\sum_{i=1}^{N}\left[2\sqrt{(\overline{q}_i(t) - q^*(t))^2}\right] + NK + N \leq \sum_{i=1}^{N}\frac{-N\left(\sum_{i=1}^{M}\delta_i + \sum_{j=1}^{N}\mu_j\right)}{\delta_i} \times$$

$$\left(\frac{\delta_i\sqrt{(\overline{q}_i(t) - q^*(t))^2}}{N\left(\sum_{i=1}^{N}\delta_i + \sum_{j=1}^{N}\mu_j\right)} - \left(\frac{\delta_i}{\sum_{i=1}^{N}\delta_i + \sum_{j=1}^{N}\mu_j} + 1\right)\right)^2 +$$

$$(N+1) \cdot \frac{\sum_{i=1}^{N}\delta_i}{\sum_{i=1}^{N}\delta_i + \sum_{j=1}^{N}\mu_j} + N \cdot \frac{\sum_{i=1}^{N}\delta_i\sum_{j=1}^{N}\mu_j}{\sum_{i=1}^{N}\delta_i + \sum_{j=1}^{N}\mu_j} + 3N + NK +$$

$$\frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} + \frac{2\sum_{i=1}^{N}\mu_i(q^*(t) - q_i(t))}{\sum_{i=1}^{N}\delta_i + \sum_{j=1}^{N}\mu_j}.$$

Then, define:

$$a_i = \frac{\delta_i}{N\left(\sum_{i=1}^{N}\delta_i + \sum_{j=1}^{N}\mu_j\right)}$$

$$b_i = \frac{\delta_i}{\sum_{i=1}^{N}\delta_i + \sum_{j=1}^{N}\mu_j} + 1$$

$$c = (N+1) \cdot \frac{\sum_{i=1}^{N}\delta_i}{\sum_{i=1}^{N}\delta_i + \sum_{j=1}^{N}\mu_j} + N \cdot \frac{\sum_{i=1}^{N}\delta_i\sum_{j=1}^{N}\mu_j}{\sum_{i=1}^{N}\delta_i + \sum_{j=1}^{N}\mu_j} + 3N + NK,$$

and the following formula is obtained:

$$E[V(t+1) - V(t) \mid V(t)] \le \quad \text{Formula (10)}$$

$$\sum_{i=1}^{N} -\frac{1}{a_i}\left(a_i\sqrt{(\overline{q}_i(t) - q^*(t))^2} - b_i\right)^2 + c +$$

$$\frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} + \frac{2\sum_{i=1}^{N}\mu_i(q^*(t) - q_i(t))}{\sum_{i=1}^{N}\delta_i + \sum_{j=1}^{N}\mu_j}.$$

Because $q^*(t)$ is the global optimal solution, $q^*(t) \le q_i(t)$, and further, the following formula is obtained:

$$\frac{2\sum_{i=1}^{N}\mu_i(q^*(t) - q_i(t))}{\sum_{i=1}^{N}\delta_i + \sum_{j=1}^{N}\mu_j} \le 0. \quad \text{Formula (11)}$$

An initial condition of the queuing model is $$\sum_{i=1}^{N}\delta_i \le \sum_{j=1}^{N}\mu_j,$$

then:

$$\frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} \le 0. \quad \text{Formula (12)}$$

It is assumed that in the (1, 1) policy, if a queuing system is not converged to the global optimal solution, t definitely exists. Therefore, when t is set to be large enough, a value of a Lyapunov function V(t) is very large. Because $V(t)=V_1(t)+V_2(t)$, at least one value of $V_1(t)$ and $V_2(t)$ is very large.

It is assumed that the value of $V_1(t)$ is very large. Because $$V_1(t) = \sum_{i=1}^{N}(\overline{q}_i(t) - q^*(t))^2,$$

it indicates that a deviation degree between the local optimal solution and the global optimal solution is relatively large, and the deviation degree is not converged to a fixed upper bound. When values of $\delta_i$, $\mu_i$ are known, a value of c is a fixed value:

$$c = (N+1) \cdot \frac{\sum_{i=1}^{N}\delta_i}{\sum_{i=1}^{N}\delta_i + \sum_{j=1}^{N}\mu_j} + N \cdot \frac{\sum_{i=1}^{N}\delta_i\sum_{j=1}^{N}\mu_j}{\sum_{i=1}^{N}\delta_i + \sum_{j=1}^{N}\mu_j} + 3N + NK.$$

Therefore, there exists a value $t_1$ such that:

$$\forall t \ge t_1, \sum_{i=1}^{N} -\frac{1}{a_i}\left(a_i\sqrt{(\overline{q}_i(t) - q^*(t))^2} - b_i\right)^2 > c. \quad \text{Formula (13)}$$

In this case, substitute Formula (11), Formula (12), and Formula (13) to Formula (10), and find the following:

$$\forall t \ge t_1, E[V(t+1) - V(t) \mid V(t)] < 0.$$

In other words, there exists $\varepsilon > 0$ such that:

$$E[V(t+1) - V(t) \mid V(t)] < -\varepsilon.$$

The Lyapunov function has a step of negatively expected drift. In other words, the (1, 1) policy is converged to a join the shortest queue (JSQ) policy of the global optimal solution, and this is contradictory to the hypothesis. Therefore, the value of $V_1(t)$ cannot be very large.

If the value of $V_2(t)$ is very large, it indicates that there exists a value $t_2$, and when $t \ge t_2$, loads of a full queue are heavy, and a value of $q_i(t)$ is very large and keeps increasing. It is assumed that the value of a global optimal solution $q^*(t)$ is not large in this case, in other words, a difference between values of $q^*(t)$ and $q_i(t)$ is very large. Because the value of c is a fixed value, then:

$$\exists t \ge t_2, \frac{2\sum_{i=1}^{N}\mu_i(q^*(t) - q_i(t))}{\sum_{i=1}^{N}\delta_i + \sum_{j=1}^{N}\mu_j} \le -c. \quad \text{Formula (14)}$$

Based on a property of a perfect square, the following formula is obtained:

$$\sum_{i=1}^{N} -\frac{1}{a_i}\left(a_i\sqrt{(\overline{q}_i(t) - q^*(t))^2} - b_i\right)^2 \le 0. \quad \text{Formula (15)}$$

Substitute Formula (12), Formula (14), and Formula (15) to Formula (10), and find the following:

$$\exists t \ge t_2, E[V(t+1) - V(t) \mid V(t)] < 0.$$

In other words, there exists ε>0 such that:

$$E[V(t+1)-V(t)|V(t)] \leq -\varepsilon.$$

The Lyapunov function has a step of negatively expected drift. In other words, the (1, 1) policy is converged to the global optimal solution, and this is contradictory to the hypothesis. Therefore, the value of $V_2(t)$ cannot be very large.

It is assumed that a value of the global optimal solution $q^*(t)$ is also very large in this case. Then, a difference between values of $q^*(t)$ and $q_r(t)$ is not large. In this case, although Formula (15) is not true, there exists $t \geq t_3$ such that:

$$\frac{2q^*(t)\left(\sum_{i=1}^{N}\delta_i - \sum_{i=1}^{N}\mu_i\right)}{\sum_{i=1}^{N}\delta_i + \sum_{j=1}^{N}\mu_j} < -c. \qquad \text{Formula (16)}$$

Substitute Formula (11), Formula (15), and Formula (16) to Formula (10), and find the following:

$$\exists t \geq t_3, E[V(t+1)-V(t)|V(t)]<0$$

In other words, there exists ε>0 such that:

$$E[V(t+1)-V(t)|V(t)] \leq -\varepsilon.$$

The Lyapunov function has a step of negatively expected drift. In other words, the (1, 1) policy is converged to the global optimal solution, and this is contradictory to the hypothesis. Therefore, the value of $V_2(t)$ cannot be very large.

So far, cases in which the Lyapunov function is not converged are all excluded. Therefore, it can be inferred that, in the (1, 1) policy ensures, a scheduling result is converged to the global optimal solution when a time is long enough. Therefore, the (1, 1) policy is stable. Still further, for an embodiment of a (d, m) policy (d>1 or m>1) with a faster convergence speed, convergence is stronger. Therefore, the load balancing policy according to this embodiment is convergent.

Figure 6:
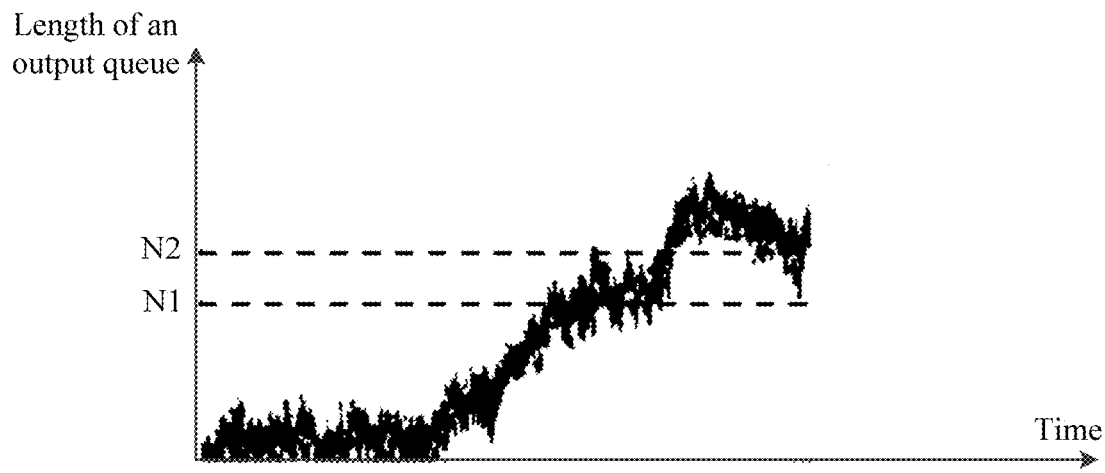
FIG. 6 is a schematic diagram of a simulation effect according to an embodiment of this application.

To further describe the technical effect of this embodiment, a three-layer DCN architecture shown in FIG. 5 is constructed on a simulation platform OMNET+ (Objective Modular Network Testbed in C++), and convergence of the solution of the present disclosure is verified by analyzing a data transmission effect in the network architecture. In the DCN architecture, each end node (for example, a server) randomly generates a data flow according to Poisson distribution, a destination address of the data flow is random, and a size of a data packet complies with heavy-tailed distribution. As shown in FIG. 6, in this embodiment of this application, when the target path is determined through the local optimal solution, a maximum difference between lengths of output queues of ports at any moment does not exceed a difference between N1 and N2. It can be learned that load balancing can be implemented using the target path determined through the local optimal solution.

Optionally, for every one or more to-be-transmitted data packets that need to be sent by the source end to the destination end, the target path may be determined once by performing step 201. For example, before step 201, the method may further include the following step.

The source end determines whether the to-be-transmitted data packet and a transmitted data packet belong to a same scheduling unit.

When the to-be-transmitted data packet and the transmitted data packet do not belong to the same scheduling unit, the source end performs step 201.

When the to-be-transmitted data packet and the transmitted data packet belong to the same scheduling unit, a target path of the transmitted data packet is used as a target path of the to-be-transmitted data packet.

Optionally, the determining whether the to-be-transmitted data packet and a transmitted data packet belong to a same scheduling unit includes: determining whether the to-be-transmitted data packet and a transmitted data packet that is transmitted within second preset duration belong to a same scheduling unit. Optionally, the scheduling unit includes a data packet, a flow, or a set of a plurality of data packets in a same flow.

Optionally, the first preset duration may be less than or equal to the second preset duration.

Step 202: The source end sends the bandwidth probe packet to the destination end through the probe channel on the target path.

In this step, optionally, a packet header of the bandwidth probe packet may include a path identifier corresponding to the target path, such that the intermediate device forwards the bandwidth probe packet to the destination end through the probe channel on the target path based on the path identifier.

Step 203: The destination end returns the bandwidth probe packet to the source end.

Step 204: The source end sends, based on the bandwidth probe packet returned by the destination end, the to-be-transmitted data packet to the destination end through a data channel on the target path.

In this step, optionally, a packet header of the to-be-transmitted data packet may include a path identifier corresponding to the target path, such that the intermediate device forwards the to-be-transmitted data packet to the destination end through the probe channel on the target path based on the path identifier.

It should be noted that an objective of step 202 to step 204 is to adjust a data packet rate on the data channel based on a packet loss rate of the bandwidth probe packet limited by the probe channel on the target path, and the like. A manner of adjusting the data packet rate on the data channel based on the packet loss rate of the bandwidth probe packet limited by the probe channel on the target path, and the like is not limited in this embodiment of this application.

In this embodiment, the source end determines, based on the load statuses of the respective probe channels on the n paths between the source end and the destination end, the target path with the lightest load in the n paths, and sends the bandwidth probe packet to the destination end through the probe channel on the target path; the destination end returns the bandwidth probe packet to the source end; and the source end sends the to-be-transmitted data packet to the destination end through the data channel on the target path based on the bandwidth probe packet returned by the destination end. Therefore, the target path with the lightest load is selected based on the load statuses of the respective probe channels on the n paths, thereby implementing load balancing among a plurality of paths.

Figure 7:
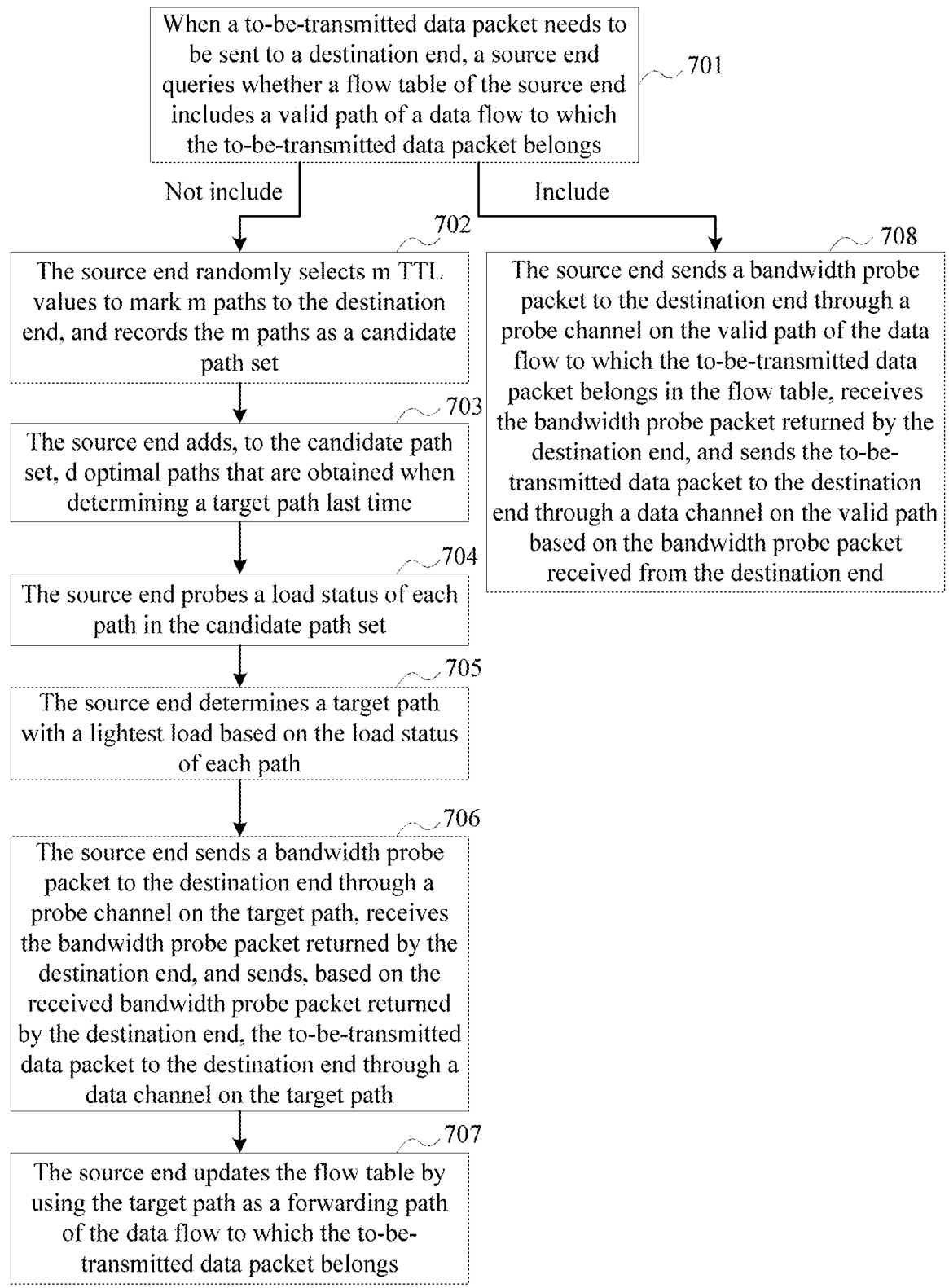
FIG. 7 is a flowchart of Embodiment 2 of a load balancing method according to an embodiment of this application.

FIG. 7 is a flowchart of Embodiment 2 of a load balancing method according to an embodiment of this application. As shown in FIG. 7, based on the foregoing method embodiment, in this embodiment, an example in which a scheduling unit is a flow and a path identifier is a TTL is used for the following description. As shown in FIG. 7, the method according to this embodiment may include the following steps.

Step 701: When a to-be-transmitted data packet needs to be sent to a destination end, a source end queries whether a flow table of the source end includes a valid path of a data flow to which the to-be-transmitted data packet belongs.

Figures 8A, 8B:
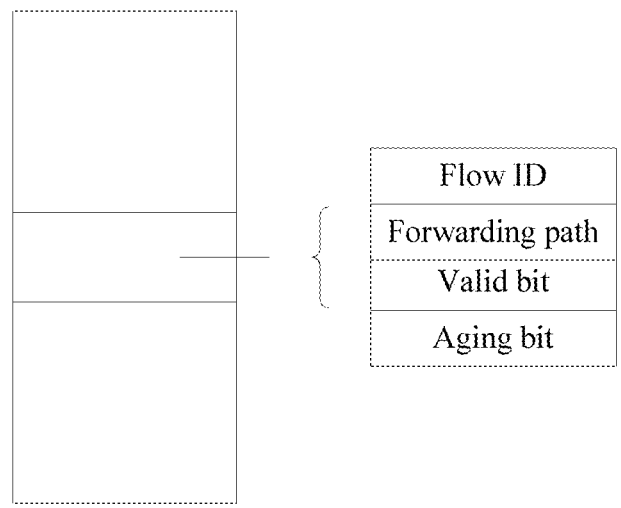
FIG. 8A is a schematic diagram of a flow table according to an embodiment of this application.
FIG. 8B is a schematic diagram of a path status table according to an embodiment of this application.

In this step, when the flow table includes a correspondence between an identifier of the data flow to which the to-be-transmitted data packet belongs and a forwarding path, and a valid status is valid, it may be determined that the flow table includes the valid path of the data flow to which the to-be-transmitted data packet belongs. When the flow table includes the correspondence between the identifier of the data flow to which the to-be-transmitted data packet belongs and the forwarding path, but the valid status is invalid, or when the flow table does not include a correspondence between the identifier of the data flow to which the to-be-transmitted data packet belongs and an identifier of the target path, it may be determined that the flow table does not include the valid path of the data flow to which the to-be-transmitted data packet belongs. For example, as shown in FIG. 8A, a table entry of the flow table of the source end may record a flow identifier (Flow ID), a forwarding path, an aging bit, and a valid bit. When the valid bit is set to true, it may be considered that the valid status is valid; and when the valid bit is set to false, it may be considered that the valid status is invalid.

Optionally, valid duration of information in the flow table may be limited to second preset duration. In other words, the flow table may be periodically updated based on the second preset duration. For example, the following flow table information update operation may be performed using the second preset duration as a period:

if the aging bit is set to false, resetting a value of the aging bit to true; and if the aging bit is set to true, changing a value of the valid bit to false.

It indicates that a flow table in which information is periodically updated may be generated in the source end. A validity period of each data flow in the flow table is the second preset duration, and a corresponding data packet that arrives within the validity period is scheduled based on a forwarding path in the flow table.

When the flow table of the source end does not include the valid path of the data flow to which the to-be-transmitted data packet belongs, the following step 702 is performed. When the flow table of the source end includes the valid path of the data flow to which the to-be-transmitted data packet belongs, the following step 708 is performed.

Step 702: The source end randomly selects m TTL values to mark m paths to the destination end, and records the m paths as a candidate path set.

Step 703: The source end adds, to the candidate path set, d optimal paths that are obtained when determining the target path last time.

In this step, optionally, the source end may maintain a path status table, to record n paths from the source end to the destination end and respective load statuses of the n paths. For example, as shown in FIG. 8B, a path status table may record a destination end identifier (DestID) such as a destination end address; a TTL value of a path such as a TTL value of a path 1 Hash1_index, a TTL value of a path 2 Hash2_index, and a TTL value of a path 3 Hash3_index; and a load status of the path such as a load status of the path 1 Hash1_metric, a load status of the path 2 Hash2_metric, and a load status of the path 3 Hash3_metric. The d paths may be determined based on the path status table.

Optionally, the path status table may be periodically updated using first preset duration as a period. For example, step 702 to step 704 may be performed to update the path status table.

It should be noted that, for descriptions of the d paths, reference may be made to the foregoing embodiment, and details are not described herein again. The candidate path set herein may be understood as a path set formed by the foregoing n paths.

Step 704: The source end probes a load status of each path in the candidate path set.

In this step, the load status of each path in the candidate path set may be probed by performing step 2011 to step 2013. After the load status of each path in the candidate path set is probed, the path status table may be updated based on the load status of each path.

Step 705: The source end determines a target path with a lightest load based on the load status of each path.

Step 706: The source end sends a bandwidth probe packet to the destination end through a probe channel on the target path, receives the bandwidth probe packet returned by the destination end, and sends a to-be-transmitted data packet to the destination end through a data channel on the target path based on the received bandwidth probe packet returned by the destination end.

In this step, the to-be-transmitted data packet may be sent to the destination end through the data channel on the target path by performing step 202 to step 204.

Step 707: The source end updates the flow table using the target path as a forwarding path of the data flow to which the to-be-transmitted data packet belongs.

In this step, optionally, the correspondence between the identifier of the data flow to which the to-be-transmitted data packet belongs and the target path may be updated to the flow table, and a valid status is set to valid. It should be noted that, for the flow table shown in FIG. 8A, after it is determined that step 702 needs to be performed, the value of the valid bit may be changed to true.

It should be noted that a sequence of performing step 707 and step 706 is not limited.

Step 708: The source end sends a bandwidth probe packet to the destination end through a probe channel on the valid path of the data flow to which the to-be-transmitted data packet belongs in the flow table, receives the bandwidth probe packet returned by the destination end, and sends, based on the bandwidth probe packet returned by the destination end, the to-be-transmitted data packet to the destination end through a data channel on the valid path.

It should be noted that step 708 is similar to step 706, and details are not described herein.

It should be noted that, for the flow table shown in FIG. 8A, after it is determined that step 708 needs to be performed, the value of the valid bit may be changed to false.

In this embodiment, when the to-be-transmitted data packet needs to be sent to the destination end, the source end queries whether the flow table of the source end includes the valid path of the data flow to which the to-be-transmitted data packet belongs. If the flow table of the source end includes the valid path of the data flow to which the to-be-transmitted data packet belongs, the source end sends the to-be-transmitted data packet to the destination end through the data channel on the valid path of the data flow to which the to-be-transmitted data packet belongs in the flow table. Otherwise, the source end determines the target path with the lightest load based on load statuses of respective probe channels on the n paths, and sends the to-be-transmitted data packet to the destination end through the data channel on the target path. Therefore, with the flow as the scheduling unit, the target path with the lightest load is selected based on the load statuses of the respective probe channels on the n paths, thereby implementing load balancing among a plurality of paths.

Figure 9:
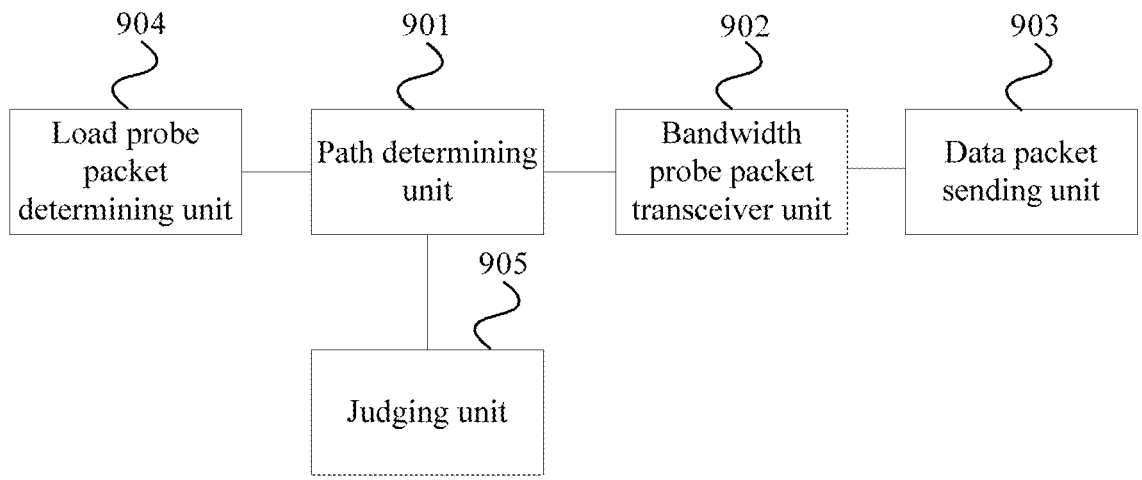
FIG. 9 is a schematic structural diagram of a source end according to an embodiment of this application.

FIG. 9 is a schematic structural diagram of a source end according to an embodiment of this application. As shown in FIG. 9, the source end in this embodiment may include a path determining unit 901, a bandwidth probe packet transceiver unit 902, and a data packet transmitting unit 903.

The path determining unit 901 is configured to determine, based on load statuses of respective probe channels on n paths between the source end and a destination end, a target path with a lightest load in the n paths, where the probe channel is used to transmit a probe packet, the probe packet includes a bandwidth probe packet, and n is an integer greater than 1.

The bandwidth probe packet transceiver unit 902 is configured to send a bandwidth probe packet to the destination end through a probe channel on the target path, and receive the bandwidth probe packet returned by the destination end.

The data packet transmitting unit 903 is configured to send, based on the bandwidth probe packet returned by the destination end, a to-be-transmitted data packet to the destination end through a data channel on the target path.

In an implementable design, the probe packet further includes a load probe packet. Additionally, the source end further includes a load probe packet determining unit 904 configured to: send a load probe packet to the destination end through a probe channel on each of the n paths; receive the load probe packet returned by the destination end; and determine, based on the load probe packet returned on each path, a load status of the probe channel on each path.

In an implementable design, that the load probe packet determining unit 904 is configured to determine, based on the load probe packet returned on each path, a load status of the probe channel on each path includes: using a round trip time (RTT) or an explicit congestion notification (ECN) identifier of the load probe packet returned on each path as load status information of the probe channel on each path.

In an implementable design, the load probe packet determining unit 904 is configured to periodically perform the following steps within first preset duration: sending the load probe packet to the destination end through the probe channel on each of the n paths; receiving the load probe packet returned by the destination end; and determining, based on the load probe packet returned on each path, the load status of the probe channel on each path.

In an implementable design, the n paths are in one-to-one correspondence with n path identifiers, and the path identifier is used by an intermediate device to perform routing using a hash algorithm. Additionally, the load probe packet that is sent to the destination end through the probe channel on each path includes a path identifier corresponding to a path, where a packet header of the bandwidth probe packet and a packet header of the data packet all include a path identifier corresponding to the target path.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In an implementable design, m is equal to 2.

In an implementable design, the source end further includes a judging unit 905 configured to determine whether the to-be-transmitted data packet and a transmitted data packet belong to a same scheduling unit.

The path determining unit 901 is configured to: when the to-be-transmitted data packet and the transmitted data packet do not belong to the same scheduling unit, determine the target path in the n paths based on the load statuses of the respective probe channels on the n paths between the source end and the destination end.

In an implementable design, the path determining unit 901 is further configured to: when the to-be-transmitted data packet and the transmitted data packet belong to the same scheduling unit, use a target path of the transmitted data packet as a target path of the to-be-transmitted data packet.

In an implementable design, the judging module 905 is configured to determine whether the to-be-transmitted data packet and a transmitted data packet that is transmitted within second preset duration belong to a same scheduling unit.

In an implementable design, the scheduling unit includes a data packet, a flow, or a set of a plurality of data packets in a same flow.

The source end in this embodiment may be configured to execute the technical solution of a source end side according to the embodiments shown in FIG. 2 and FIG. 7, implementation principles and technical effects thereof are similar to those in the embodiments shown in FIG. 2 and FIG. 7, and details are not described herein.

Figure 10:
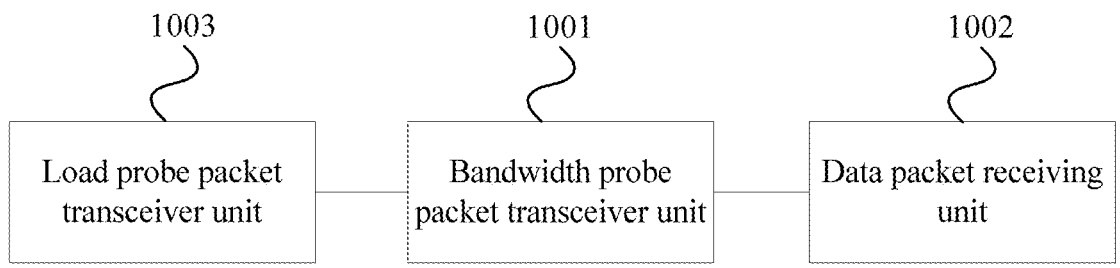
FIG. 10 is a schematic structural diagram of a destination end according to an embodiment of this application.

FIG. 10 is a schematic structural diagram of a destination end according to an embodiment of this application. As shown in FIG. 10, the destination end in this embodiment may include a bandwidth probe packet transceiver unit 1001 and a data packet receiving unit 1002.

The bandwidth probe packet transceiver unit 1001 is configured to receive a bandwidth probe packet sent by a source end through a probe channel on a target path, where the target path is a path with a lightest load in n paths that is determined by the source end based on load statuses of respective probe channels on the n paths between the source end and the destination end, the probe channel is used to transmit a probe packet, the probe packet includes the bandwidth probe packet, and n is an integer greater than 1.

The bandwidth probe packet transceiver unit 1001 is further configured to return the bandwidth probe packet to the source end.

The data packet receiving unit 1002 is configured to receive a data packet sent by the source end through a data channel on the target path.

In an implementable design, the probe packet further includes a load probe packet. Additionally, the destination end further includes a load probe packet transceiver unit 1003 configured to: receive a load probe packet sent by the source end through a probe channel on each of the n paths; and return the load probe packet received through the probe channel on each path to the source end.

In an implementable design, the n paths are in one-to-one correspondence with n path identifiers, and the path identifier is used by an intermediate device to perform routing using a hash algorithm. Additionally, a packet header of the load probe packet that is sent to the destination end through the probe channel on each path includes a path identifier corresponding to a path, where a packet header of the bandwidth probe packet and a packet header of the data packet all include a path identifier corresponding to the target path.

In an implementable design, n is less than a total quantity of paths between the source end and the destination end, and the n path identifiers include randomly determined m path identifiers, and path identifiers respectively corresponding to d paths in all paths used to determine the target path previously, where n is greater than or equal to m and is less than or equal to m+d, and loads of the d paths are less than or equal to a load of another path in all the paths.

In an implementable design, m is equal to 2.

The destination end in this embodiment may be configured to execute the technical solution of a destination end side according to the embodiments shown in FIG. 2 and FIG. 7, implementation principles and technical effects thereof are similar to those in the embodiments shown in FIG. 2 and FIG. 7, and details are not described herein.

Figure 11:
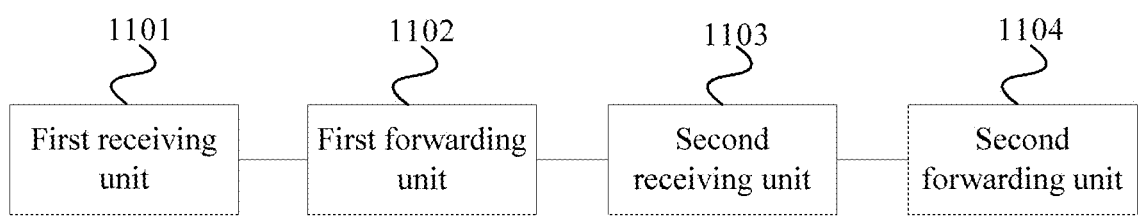
FIG. 11 is a schematic structural diagram of an intermediate device according to an embodiment of this application.

FIG. 11 is a schematic structural diagram of an intermediate device according to an embodiment of this application. As shown in FIG. 11, the intermediate device in this embodiment may include a first receiving unit 1101, a first forwarding unit 1102, a second receiving unit 1103, and a second forwarding unit 1104.

The first receiving unit 1101 is configured to receive a load probe packet sent by a source end.

The first forwarding unit 1102 is configured to forward the load probe packet to a destination end through a probe channel, where the probe channel is used to transmit a probe packet, and the probe packet includes the load probe packet.

The second receiving unit 1103 is configured to receive the load probe packet returned by the destination end.

The second forwarding unit 1104 is configured to forward the load probe packet returned by the destination end to the source end.

In an implementable design, the first forwarding unit 1102 is configured to forward the load probe packet to the destination end through the probe channel based on a queuing policy.

In an implementable design, the first forwarding unit 1102 is configured to forward the load probe packet to the destination end through the probe channel based on a highest priority policy.

In an implementable design, the second forwarding unit 1104 is configured to forward the load probe packet returned by the destination end to the source end based on the highest priority policy.

In an implementable design, a packet header of the load probe packet includes a path identifier. Additionally, that the first forwarding unit 1102 is configured to forward the load probe packet to a destination end through a probe channel includes: forwarding the load probe packet to the destination end through the probe channel based on the path identifier using a hash algorithm.

The intermediate device in this embodiment may be configured to execute the technical solution of an intermediate device side according to the embodiments shown in FIG. 2 and FIG. 7, implementation principles and technical effects thereof are similar to those in the embodiments shown in FIG. 2 and FIG. 7, and details are not described herein.

It should be understood that, division of the units of the foregoing communications devices is merely logical function division, and during actual implementation, the units may be all or partially integrated into a physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, a transmitting unit may be an independently disposed processing element, or may be integrated into a chip of a network device for implementation. In addition, the transmitting unit may be alternatively stored in a memory of a network device in a form of a program, and a processing element of the network device invokes and executes a function of the transmitting unit. Implementation of the other units is similar to that of the transmitting unit. In addition, all or some of the units may be integrated together, or may be implemented independently. The processing element herein may be an integrated circuit with a signal processing capability. In an implementation process, steps in the foregoing methods or the foregoing units can be implemented using a hardware integrated logical circuit in the processing element, or using instructions in a form of software. In addition, the transmitting unit is a transmitting control unit, and may receive information using a transmitting apparatus of the network device such as an antenna and a radio frequency apparatus.

The foregoing units may be configured as one or more integrated circuits for implementing the foregoing method, for example, one or more application-specific integrated circuits (ASICs), one or more microprocessors (e.g., digital signal processor (DSPs)), or one or more field-programmable gate arrays (FPGAs). For another example, when one of the foregoing units is implemented by a processing element by invoking a program, the processing element may be a general-purpose processor, for example, a central processing unit (CPU) or another processor that can invoke the program. For another example, the units may be integrated together, and implemented in a form of a system on chip (SOC).

Figure 12:
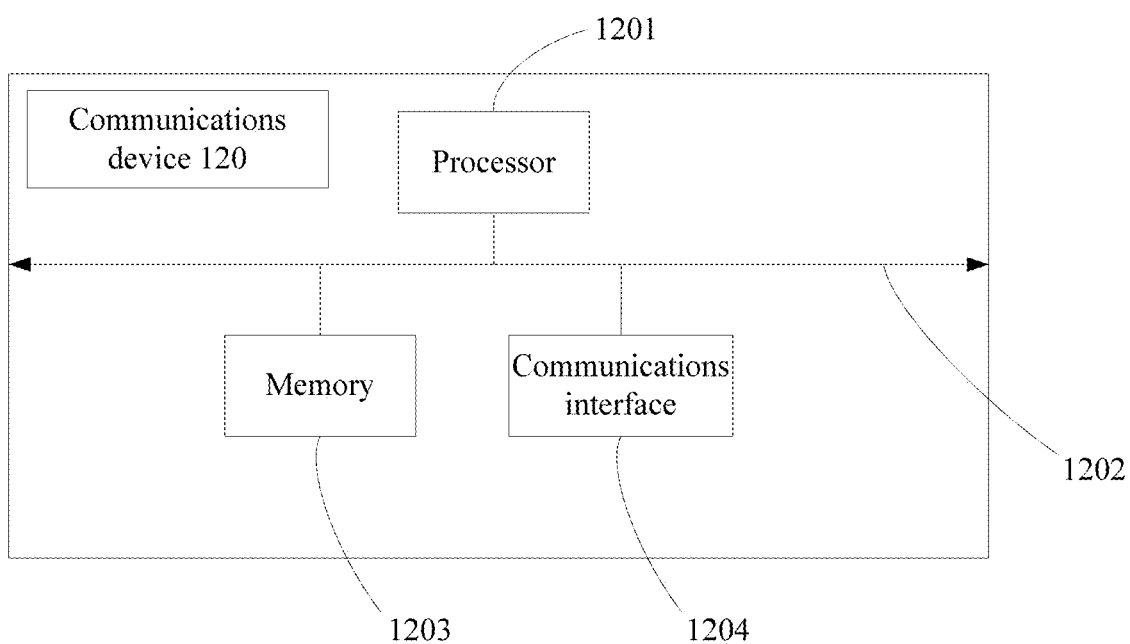
FIG. 12 is a schematic diagram of a hardware structure of a communications device according to an embodiment of this application.

FIG. 12 is a schematic diagram of a hardware structure of a communications device according to an embodiment of this application. The communications device 120 includes at least one processor 1201, a communications bus 1202, a memory 1203, and at least one communications interface 1204.

The processor 1201 may be a CPU, a microprocessor, an ASIC, or one or more integrated circuits configured to control program execution in the solutions of this application.

The communications bus 1202 may include a channel, to transfer information between the foregoing components.

The communications interface 1204 uses any apparatus such as a transceiver to communicate with another device or a communications network, such as the Ethernet, a radio access network (RAN), or a wireless local area network (WLAN).

The memory 1203 may be a read-only memory (ROM), another type of static storage device that can store static information and instructions, a random-access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor using a bus. The memory may be alternatively integrated with the processor.

The memory 1203 is configured to store application program code for executing the solution of this application, and the processor 1201 controls the execution. The processor 1201 is configured to execute the application program code stored in the memory 1203, to implement the load balancing method according to the foregoing embodiments of this application.

Alternatively, optionally, in this embodiment of this application, the processor 1201 may perform processing-related functions in the load balancing method provided in the foregoing embodiments, and the communications interface 1204 is responsible for communicating with another device or a communications network. This is not specifically limited in this embodiment of this application.

In implementation, in an embodiment, the processor 1201 may include one or more CPUs.

In implementation, in an embodiment, the communications device 120 may include a plurality of processors. Each of the processors may be a single-core processor (single-CPU), or may be a multi-core processor (multi-CPU). The processors herein may be one or more devices, circuits, and/or processing cores for processing data (for example, computer program instructions).

In implementation, in an embodiment, the communications device 120 may further include an output device and an input device. The output device communicates with the processor 1201, and may display information in a plurality of manners. For example, the output device may be a liquid-crystal display (LCD), a light-emitting diode (LED) display device, a cathode ray tube (CRT) display device, a projector, or the like. The input device communicates with the processor 1201, and may receive input of a user in a plurality of manners. For example, the input device may be a mouse, a keyboard, a touchscreen device, a sensor device, or the like.

In addition, as described above, the communications device 120 according to this embodiment of this application may be a chip, or a source end, or a destination end, or an intermediate device, or a device having a structure similar to that in FIG. 12. A type of the communications device 120 is not limited in this embodiment of this application.

In this embodiment, the communications device 120 is presented with the function modules implemented through integration. The "module" herein may be an ASIC, a circuit, a processor and a memory that execute one or more software programs or firmware programs, an integrated logic circuit, and/or another device that can provide the foregoing function. In a simple embodiment, a person skilled in the art may figure out that the communications device 120 may use the form shown in FIG. 12. For example, the function/implementation process of the units in FIG. 9 to FIG. 11 may be implemented by the processor 1201 and the memory 1203 in FIG. 12. The path determining unit in FIG. 9 may be executed by the processor 1201 by invoking the application program code stored in the memory 1203, and this is not limited in this embodiment of this application. Alternatively, the bandwidth probe packet transceiver unit in FIG. 9 may be implemented using the communications interface 1204 in FIG. 12, and this is not limited in this embodiment of this application.

It should be noted that the communications device according to this embodiment shown in FIG. 12 may be the source end in the embodiment shown in FIG. 2 or FIG. 7. When the processor 1201 invokes the program stored in the memory 1203, the method on the source end side according to the embodiment shown in FIG. 2 or FIG. 7 may be performed.

It should be noted that the communications device according to this embodiment shown in FIG. 12 may be the destination end in the embodiment shown in FIG. 2 or FIG. 7. When the processor 1201 invokes the program stored in the memory 1203, the method on the destination end side according to the embodiment shown in FIG. 2 or FIG. 7 may be performed.

It should be noted that the communications device according to this embodiment shown in FIG. 12 may be the intermediate device in the embodiment shown in FIG. 2 or FIG. 7. When the processor 1201 invokes the program stored in the memory 1203, the method on the intermediate device side according to the embodiment shown in FIG. 2 or FIG. 7 may be performed.

Optionally, an embodiment of this application provides a communications system. The communications system may include the source end, the destination end, and the intermediate device in any one of the foregoing embodiments.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A load balancing method, comprising:
    recording one or more d paths that were used as a previous target path from a source end to a destination end;
    performing random selection on a first group of paths by randomly selecting m paths from the first group of paths, wherein the first group of paths are all paths between the source end and the destination end;
    adding the one or more d paths to the m paths to determine n paths, wherein a first quantity of the n paths is less than a second quantity of the all paths and greater than a third quantity of the m paths;
    selecting the n paths;
    selecting, based on load statuses of respective probe channels on the n paths, a current target path with a lightest load in the n paths, wherein each of the respective probe channels is for transmitting a probe packet, wherein the probe packet comprises a bandwidth probe packet, and wherein n is an integer greater than 1;

sending, subsequent to and based on selecting the current target path, the bandwidth probe packet to the destination end through a first probe channel on the current target path, wherein the first probe channel is selected from the respective probe channels;

receiving, subsequent and responsive to the sending, the bandwidth probe packet from the destination end; and sending, in response to receiving the bandwidth probe packet from the destination end, a to-be-transmitted data packet to the destination end through a data channel on the current target path.

2. The load balancing method according to claim 1, wherein the probe packet further comprises a load probe packet, and wherein before selecting the current target path, the load balancing method further comprises:

sending the load probe packet to the destination end through a probe channel on each of the n paths;

receiving the load probe packet from the destination end; and determining, based on the load probe packet on each of the n paths, a load status of the probe channel on each of the n paths.

3. The load balancing method according to claim 2, wherein determining the load status comprises using a round-trip time (RTT) or an explicit congestion notification (ECN) identifier of the load probe packet returned on each of the n paths as load status information of the probe channel on each of the n paths.

4. The load balancing method according to claim 2, further comprising periodically performing a set of steps within a first preset duration, the set of steps comprising:

sending the load probe packet to the destination end through the probe channel on each of the n paths;

receiving the load probe packet from the destination end; and determining, based on the load probe packet returned on each of the n paths, the load status of the probe channel on each of the paths.

5. The load balancing method according to claim 2, wherein the n paths are in one-to-one correspondence with n path identifiers, wherein the n path identifiers are for an intermediate device to perform routing using a hash algorithm, wherein the load probe packet that is sent to the destination end through the probe channel on each of the n paths comprises a path identifier corresponding to a path, and wherein a packet header of the bandwidth probe packet and a packet header of the to-be-transmitted data packet all comprise a target path identifier corresponding to the current target path.

6. The load balancing method according to claim 5, wherein the n path identifiers comprise randomly determined m path identifiers corresponding to the m paths and one or more d path identifiers corresponding to the one or more d paths, wherein the first quantity of the n paths is greater than or equal to the third quantity of the m paths and is less than or equal to the third quantity of the m paths plus a fourth quantity of the one or more d paths, and wherein loads of the one or more d paths are less than or equal to a load of another path in the all paths.

7. The load balancing method according to claim 6, wherein the third quantity of the m paths is 2, and wherein the first quantity of the n paths is equal to the fourth quantity of the one or more d paths plus the third quantity of the m paths.

8. The load balancing method according to claim 1, wherein before selecting the current target path, the load balancing method further comprises:

determining whether the to-be-transmitted data packet and a transmitted data packet belong to a same scheduling unit; and selecting the current target path when the to-be-transmitted data packet and the transmitted data packet do not belong to the same scheduling unit.

9. The load balancing method according to claim 8, further comprising using another target path of the transmitted data packet as the current target path when the to-be-transmitted data packet and the transmitted data packet belong to the same scheduling unit.

10. The load balancing method according to claim 8, further comprising determining whether the to-be-transmitted data packet and the transmitted data packet belong to the same scheduling unit by determining whether the to-be-transmitted data packet and the transmitted data packet are transmitted within a preset duration.

11. The load balancing method according to claim 8, wherein the same scheduling unit comprises a data packet, a flow, or a set of a plurality of data packets in a same flow.

12. The load balancing method of claim 1, wherein a fourth quantity of the one or more d paths is one.

13. The load balancing method of claim 12, wherein the third quantity is two.

14. A load balancing method, comprising:

receiving a bandwidth probe packet from a source end through a probe channel on a current target path, wherein the current target path is a path with a lightest load in n paths between the source end and a destination end and is based on load statuses of respective probe channels on the n paths, wherein the probe channel is for transmitting a probe packet, wherein the probe packet comprises the bandwidth probe packet, wherein n is an integer greater than 1, wherein a first quantity of the n paths is less than a second quantity of all paths between the source end and the destination end, and wherein the n paths correspond to m randomly selected paths that are randomly selected from the all paths plus one or more d paths that were used as a previous target path such that the first quantity of the n paths is equal to a third quantity of the m randomly selected paths plus a fourth quantity of the one or more d paths;

returning the bandwidth probe packet to the source end; and receiving, in response to returning the bandwidth probe packet, a data packet from the source end through a data channel on the current target path.

15. The load balancing method according to claim 14, wherein the probe packet further comprises a load probe packet, and wherein before receiving the bandwidth probe packet, the load balancing method further comprises:

receiving the load probe packet from the source end through a probe channel on each of the n paths; and returning the load probe packet to the source end.

16. The load balancing method according to claim 15, wherein the n paths are in one-to-one correspondence with n path identifiers, wherein the n path identifiers are for an intermediate device to perform routing using a hash algorithm, wherein a packet header of the load probe packet that is sent through the probe channel on each path comprises a path identifier corresponding to a path, and wherein a packet header of the bandwidth probe packet and a packet header of the data packet all comprise a target path identifier corresponding to the current target path.

17. The load balancing method according to claim 16, wherein the n path identifiers comprise randomly determined m path identifiers corresponding to the m paths and one or more d path identifiers corresponding to the one or more d paths, and wherein loads of the one or more d paths are less than or equal to a load of another path in the all paths.

18. The load balancing method according to claim 17, wherein the third quantity of the m paths is 2.

19. A load balancing method, comprising:
receiving a load probe packet from a source end; and
forwarding the load probe packet to a destination end through a probe channel on a current target path, wherein the current target path is a path with a lightest load in n paths between the source end and the destination end and is based on load statuses of respective probe channels on the n paths, wherein the probe channel is for transmitting a probe packet, wherein the probe packet comprises a bandwidth probe packet, wherein n is an integer greater than 1, wherein a first quantity of the n paths is less than a second quantity of all paths between the source end and the destination end, and wherein the n paths correspond to m randomly selected paths that are randomly selected from the all paths plus one or more d paths that were used as a previous target path such that the first quantity of the n paths is equal to a third quantity of the m randomly selected paths plus a fourth quantity of the one or more d paths.

20. The load balancing method according to claim 19, wherein forwarding the load probe packet to the source end comprises forwarding the load probe packet to the source end based on a highest priority policy.

21. The load balancing method according to claim 19, wherein a packet header of the load probe packet comprises a path identifier, and wherein forwarding the load probe packet to the destination end through the probe channel comprises forwarding the load probe packet to the destination end through the probe channel based on the path identifier using a hash algorithm.

* * * * *